United States Patent
Ogatsu et al.

(10) Patent No.: US 7,333,237 B2
(45) Date of Patent: Feb. 19, 2008

(54) COLOR ADJUSTMENT METHOD, COLOR ADJUSTMENT APPARATUS, COLOR CONVERSION DEFINITION EDITING APPARATUS, IMAGE PROCESSING APPARATUS, PROGRAM, AND STORAGE MEDIUM

(75) Inventors: Hitoshi Ogatsu, Kangawa (JP); Hiroaki Ikegami, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1111 days.

(21) Appl. No.: 10/385,507

(22) Filed: Mar. 12, 2003

(65) Prior Publication Data

US 2004/0057614 A1 Mar. 25, 2004

(30) Foreign Application Priority Data

Sep. 20, 2002 (JP) ............... 2002-275821

(51) Int. Cl.
*G06K 9/00* (2006.01)
(52) U.S. Cl. .................. 358/1.9; 358/3.2; 358/418; 358/518
(58) Field of Classification Search ........... 358/504, 358/518, 537, 520, 523, 530, 1.9; 395/131, 395/109; 345/150, 199; 382/162, 305; 347/43
See application file for complete search history.

(56) References Cited

U.S. PATENT DOCUMENTS

| | | | | |
|---|---|---|---|---|
| 5,583,665 A | * | 12/1996 | Gregory et al. | ............. 358/504 |
| 2001/0028738 A1 | * | 10/2001 | Pettigrew et al. | ........... 382/162 |
| 2002/0036786 A1 | * | 3/2002 | Kondo | ........................ 358/1.9 |
| 2002/0071615 A1 | * | 6/2002 | Kobayashi et al. | ......... 382/305 |
| 2002/0126302 A1 | * | 9/2002 | Fukao | .......................... 358/1.9 |
| 2003/0081060 A1 | * | 5/2003 | Zeng et al. | .................... 347/43 |

FOREIGN PATENT DOCUMENTS

| | | |
|---|---|---|
| JP | A 64-16658 | 1/1989 |
| JP | A 2-96477 | 4/1990 |
| JP | A 4-321182 | 11/1992 |
| JP | A 9-214792 | 8/1997 |
| JP | A-10-326340 | 12/1998 |
| JP | A-2001-291097 | 10/2001 |

* cited by examiner

*Primary Examiner*—King Y. Poon
*Assistant Examiner*—Allen Nguyen
(74) *Attorney, Agent, or Firm*—Oliff & Berridge, PLC

(57) ABSTRACT

Adjustment object color space containing movement source partial color space including a color of an object of conversion processing and movement destination partial color space including a color in which the conversion processing is performed so as to inscribe the spaces is handled as a conversion object region. The inside of the conversion object region is moved toward a target color so that coordinates of an adjustment object overlaps with coordinates of a point after movement and the boundary of a movement region moves little or does not move at all. As a result of this, a phenomenon such as a color jump or gradation inversion occurs little in the boundary portion to the outside of an adjustment object region. Therefore, maintenance of gradation continuity of an image of a color adjustment object and prevention of color inversion can be combined to make partial color adjustment.

27 Claims, 13 Drawing Sheets

*IN CASE OF CYLINDRICAL SHAPE

DLUT : EXAMPLE OF THREE DIMENSION

IF INPUT VALUE POSITIONING BETWEEN
LATTICE POINTS ENTERS, INTERPOLATION
IS PERFORMED WITH REFERENCE
TO NEIGHBOR LATTICE POINT

TWO DIMENSIONAL LUT

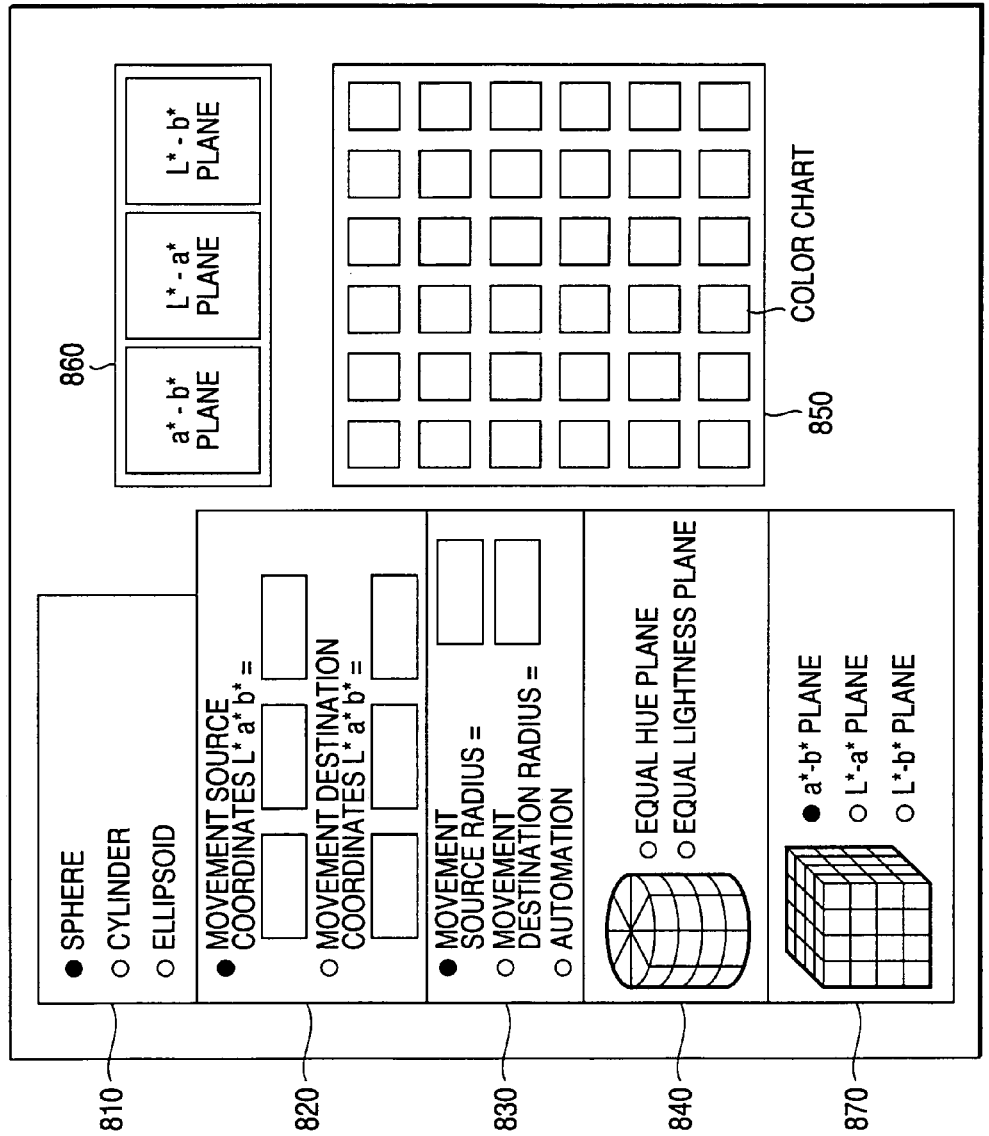

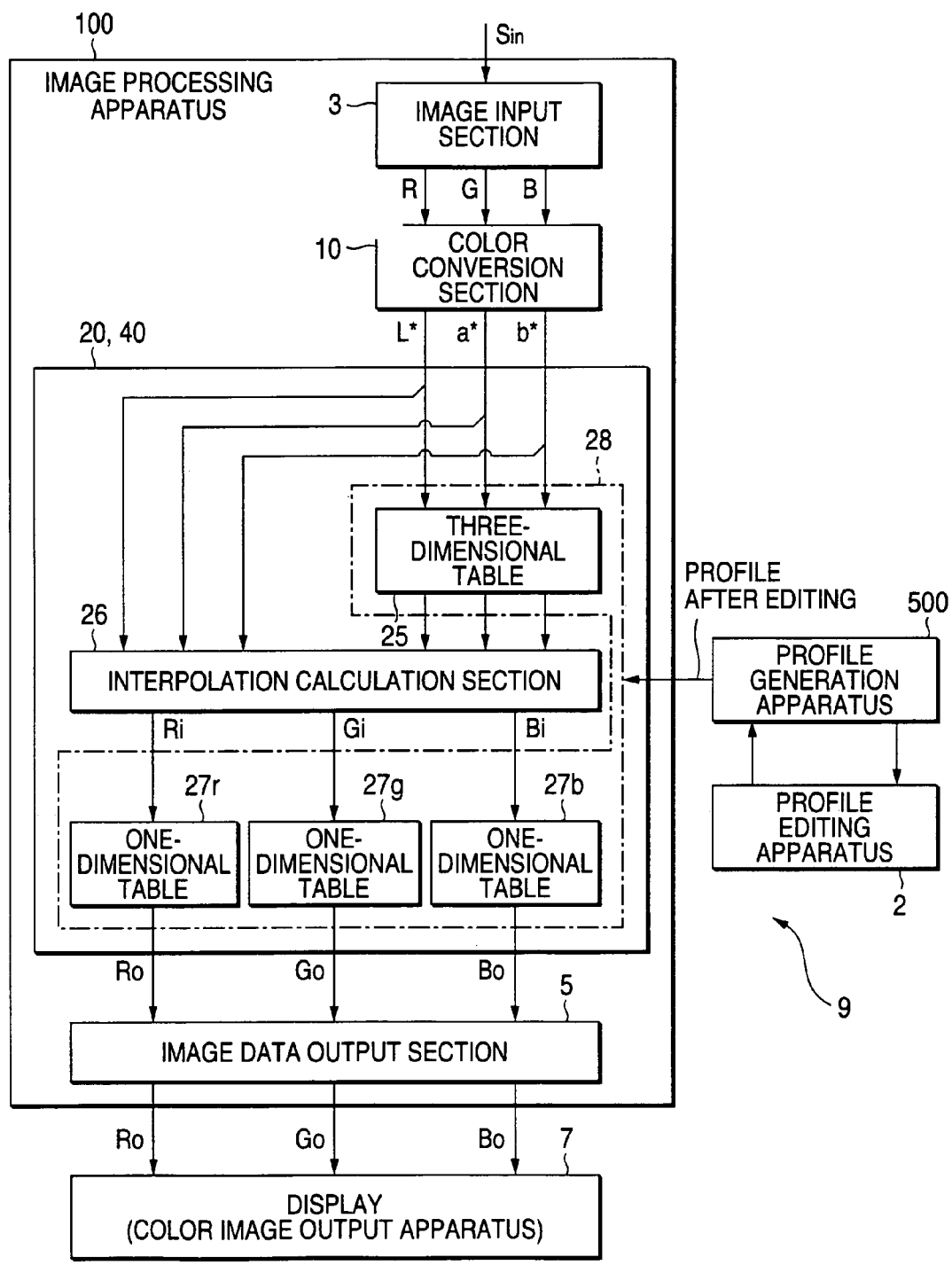

COLOR ADJUSTMENT METHOD, COLOR ADJUSTMENT APPARATUS, COLOR CONVERSION DEFINITION EDITING APPARATUS, IMAGE PROCESSING APPARATUS, PROGRAM, AND STORAGE MEDIUM

The present disclosure relates to the subject matter contained in Japanese Patent Application No. 2002-275821 filed on Sep. 20, 2002, which is incorporated herein by reference in its entirety.

BACKGROUND OF THE INVENTION

1. Field of the Invention

The present invention relates to a color adjustment method, a color adjustment apparatus, a color conversion definition editing apparatus, an image processing apparatus, a program, and a computer readable storage medium in which the program is stored. More particularly, it relates to a color adjustment function of a color image or an editing function of a color image color conversion coefficient in a color image processing apparatus or a color image color conversion coefficient generation apparatus. Specifically, a technique for converting a color of a color space coordinate system into another color on the same color space in an apparatus such as a digital color copying machine, a printer, a printer driver, a printer controller, a color FAX or a color display including color adjustment as a part of its function, a color conversion generation apparatus called a profiler for generating a color conversion coefficient (profile), or an apparatus for editing or adjusting a profile.

2. Description of the Related Art

There is a color adjustment function as one of functions of adjusting a digital color image. In this color adjustment function, there is often a case that it is difficult to make desired conversion generally when relevance to perception about color such as hue, saturation and lightness of a person is low. In reverse, a computer graphics (CG) designer for directly handling RGB or a print-related designer for directly handling CMYK mainly, etc. are accustomed to editing of the RGB or CMYK on a routine basis and there is also a case that editing can be performed in RGB color space or CMYK color space conversely as intended. Thus, depending on object fields, color space for color adjustment ranges widely.

Also, color adjustment can be broadly divided into total region color adjustment influencing a color space total region to which a digital color image belongs and partial color adjustment influencing only its partial color space. A concrete example of the total region color adjustment includes contrast enhancement, saturation enhancement and color balance adjustment, and a concrete example of the partial color adjustment includes an example of adjusting only a flesh color.

As the art related to the total region color adjustment, for example, a technique in which an RGB color signal from a scanner is converted into an HLS color signal every hue (H), lightness (L) and saturation (S) using an independent lookup table and the HLS color signal after the conversion is inversely converted into the RGB color signal and thereby color adjustment and color modification are made in the form adapted to perception of a person is disclosed in JP-A-64-16658.

However, this technique is a technique for making total color adjustment or color modification, and it is difficult to adjust only a local color in great demand for a person within color space, for example, to reproduce only a color such as a flesh color which a person has as an image, the so-called memory color to a preferable color.

On the other hand, as the art related to the partial color adjustment, for example, a technique in which a color conversion section is constructed of a developed color system unit, a memory color adjustment unit and an inverse developed color system unit and an RGB color signal from a scanner is converted into a color signal such as hue, saturation and lightness fit for a sense of a person and also only an object region of a memory color such as a flesh color is converted by an object region specification table so that discontinuity does not occur between a region outside an object and the object region and the color signal after the conversion is inversely converted into the RGB color signal and thereby color adjustment is made independently of masking is disclosed in JP-A-2-96477.

This technique disclosed in JP-A-2-96477 is a technique for making smooth local color adjustment by multiplying the movement amount by a function of a distance from the center of movement (the center of gravity) as weight, but lightness is handled independently of chromaticity (hue, saturation), so that there is a disadvantage that it cannot be applied to color space in which lightness is not independent like RGB space. That is, a movement distance and an influenced range are in a dependent relation when a condition that gradation inversion is not caused is added, and the amount of local color adjustment is determined by the center of gravity, a movement vector and a weight function (a distance from the center of gravity and an applied range), so that it is difficult to be applied to a system other than a lightness and chromaticity separation system. Also, a method for increasing an object region specification table must be adopted for adjusting plural colors and there is a demerit that a load on hardware increases.

Also, a technique in which a representative color representative of a color of an adjustment object region is determined based on image data showing a color of each pixel included in the adjustment object region extracted from a color image and a fundamental vector showing movement in color space from the representative color to a target color is obtained according to an input of a target color targeted for a color after adjustment of the adjustment object region and image data included in the adjustment object region is moved in the color space according to a direction and a distance shown by the fundamental vector is disclosed in Japanese Patent No. 3009934 (JP-A-4-321182). Specifically, it is the technique in which a representative color representative of a color of an adjustment object region is determined and a movement vector is obtained from a target color after adjustment and distance weight is obtained from a distance between a color of each pixel and the target color and the movement amount is obtained by multiplying the movement vector by the weight coefficient.

Also, a technique in which partial color adjustment is made so that it does not become discontinuous with the outside of a partial range by specifying each of the color coordinates before and after conversion and ranges of a sphere or an ellipsoid, etc. containing them is disclosed in JP-A-9-214792. This technique discloses a technique for solution by determining weight of movement by a Euclidean distance from the center of gravity in color space such as RGB color space or L*a*b* color space with respect to a problem that lightness is independently handled (distance calculation is independently performed in lightness and chromaticity) in the technique described in JP-A-2-96477.

According to this technique, an arbitrary color of an arbitrary color space coordinate system can be converted into another color on the same color space so that discontinuity does not occur in the boundary of a color outside an object and also, plural colors can be converted into other colors respectively and further in that case, not only when a weight coefficient function is fixed with respect to the respective colors but also when the weight coefficient function is switched, its weight coefficient function can be implemented by a one-dimensional lookup table, so that there is an advantage that a load is not applied to hardware.

However, this technique has flexibility higher than that of the technique described in JP-A-2-96477, but the fact that a movement distance and an influenced range are in a dependent relation when a condition that gradation inversion is not caused is added remains unchanged.

Incidentally, advantageous features common to JP-A-2-96477, Japanese Patent No. 3009934 (JP-A-4-321182) and JP-A-9-214792 described above are that it moves from a color before adjustment to a color after adjustment inside an adjustment object region, and conversion is made so that it does not become discontinuous in the boundary between the adjustment object region and the outside of the adjustment object region.

By the way, the conventional art described above focuses attention on only continuity between an adjustment object region and the outside of the adjustment object region in color reproduction when partial color adjustment is made, and does not take inversion or continuity of a tone into consideration. Therefore, when the conventional art is applied to make the partial color adjustment, for example, unpictorial image reproduction (perceived by eyes of a person) resulting from discontinuity (inversion or sudden change) of a tone occurs. More specifically, for example, when it is considered that a desired color coordinate before adjustment inside color coordinate space is adjusted to a color coordinate after adjustment, a disadvantage that gradation inversion occurs unless a color adjustment region containing the color coordinate before adjustment and the color coordinate after adjustment is assumed occurs.

Also, the conventional art described above has no flexibility of arbitrarily specifying a color coordinate before adjustment, a color coordinate after adjustment and an adjustment object region, and the minimum adjustment object region is determined by the color coordinate before adjustment and the color coordinate after adjustment. There is qualitatively constraint that the adjustment object region must be taken wider as a distance between the color coordinate before adjustment and the color coordinate after adjustment increases.

SUMMARY OF THE INVENTION

The invention is implemented in view of the circumstances described above. An object of the invention is to provide a color adjustment method and apparatus capable of combining maintenance of gradation continuity of an adjustment object and prevention of inversion of a color without constraint of an adjustment object region, or a color conversion definition editing apparatus or an image processing apparatus using this color adjustment method.

Also, another object of the invention is to provide a program suitable to implement the color adjustment method and apparatus by software using an electronic computer, and a computer readable storage medium in which the program is stored.

That is, there is provided a color adjustment method for obtaining a coefficient for performing color conversion of input color space into output color space with respect to a predetermined adjustment object region within color space to which a color image belongs. The color adjustment method includes obtaining a coefficient for converting a color within the adjustment object region into another color on the output color space, which is the same color space as the input color space, with maintaining continuity of gradations and not causing color inversion within the adjustment object region.

A color adjustment apparatus according to the invention is an apparatus for performing a color adjustment method according to the invention. The color adjustment apparatus includes a coefficient acquisition section for obtaining a coefficient for converting a color within the adjustment object region into another color on the output color space, which is the same color space as the input color space, with maintaining continuity of gradations and not causing color inversion within the adjustment object region.

A color conversion definition editing apparatus according to the invention includes a color adjustment apparatus according to the invention and a coefficient editing section for replacing the coefficient obtained by the coefficient acquisition section with a coefficient of the color conversion definition, which is prepared in advance, to edit the color conversion definition.

A first image processing apparatus according to the invention includes the color adjustment apparatus according to the invention and a partial color adjustment section for moving pixel data indicating color of each pixel included in the adjustment object region extracted from the input color image in the color space based on the coefficient obtained by the coefficient acquisition section to perform color conversion.

A second image processing apparatus according to the invention includes a storage section for storing a color conversion definition, and a partial color adjustment section for converting pixel data indicating color of each pixel included in the adjustment object region extracted from the input color image in the color space based on the color conversion definition stored by the storage section.

Further, a program according to the invention is suitable to perform the color adjustment method or the color adjustment apparatus according to the invention by software using an electronic calculator (computer). Incidentally, the program may be provided in a state of being stored in a computer readable storage medium or may be delivered through communication means by wire or wireless.

In the configuration described above, a coefficient for converting a color of the inside of the adjustment object region into another color on the output color space which is the same color space as the input color space is obtained in a state in which continuity of a tone is maintained and inversion of a color is not caused within a range of the adjustment object region. In other words, in the case of moving color coordinates of a particular region to a certain region in the inside of color space of an adjustment object, a color conversion coefficient in which continuity of a tone level or a color is not lost, that is, image quality defects such as false contouring or gradation inversion do not occur in the boundary portion to a region which is not moved is obtained. Also, using this technique, partial color adjustment is made or a color conversion definition is edited.

BRIEF DESCRIPTION OF THE DRAWINGS

FIG. 13 is a diagram showing a user interface screen generated by a partial color adjustment parameter acquisition section in the profile editing apparatus.

FIG. 14 is a block diagram showing one embodiment of an image processing system for making color conversion using an output profile edited by the profile editing apparatus.

DETAILED DESCRIPTION OF THE PREFERRED EMBODIMENTS

Embodiments of the invention will be described below in detail with reference to the drawings. First, with respect to one embodiment of a color adjustment method according to the invention, its concept will be described.

Various color spaces such as device-dependent color space, which depends on a device, and device-independent color space, which does not depend on a device, reside in color space. The device-dependent color space includes RGB color space, YCC (Y, c1, c2) color space, CMYK color space and color space expressed by four or more colors. The device-independent color space includes XYZ color space defined by CIE (Commission International de I'Eclairage), L*a*b* color space, L*u*v* color space, sRGB (standard RGB) color space, sYCC (standard YCC) color space. In many cases, the color space is expressed by three dimensions, and some device-dependent color space such as CMYK is expressed by number of dimensions, which is four or more dimensions.

In partial color adjustment, geometrical handling is performed so that the partial color adjustment is not constrained by a dimension or a kind of color space. Here, description will be made on an example of Euclidean space expressed by three dimensions of (X, Y, Z) generally. Incidentally, expansion to dimensions larger than three dimensions can also be provided. Of course, any of various device-dependent color space or various device-independent color space described above may be handled as a signal of a color adjustment object.

Figure 1:
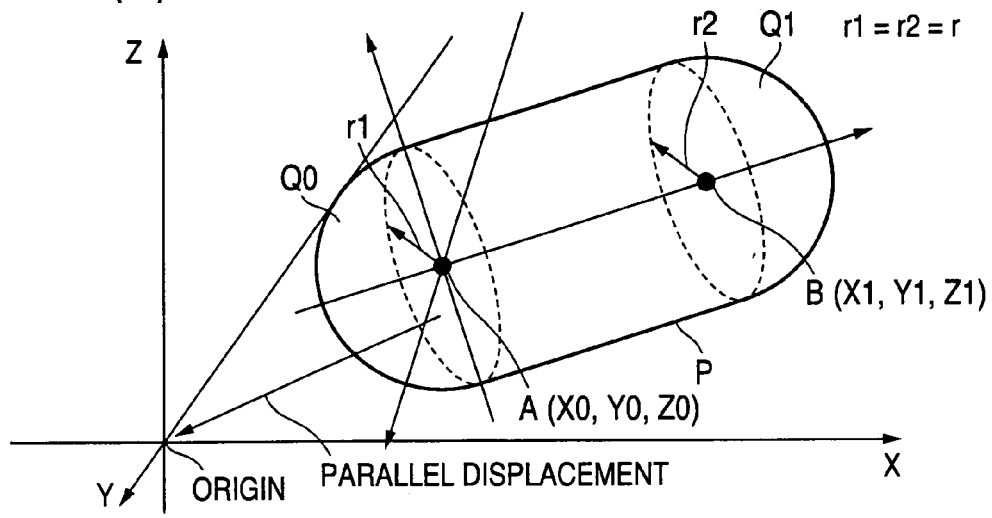
FIGS. 1(A)-1(C) are diagrams describing a relation among movement source partial color space, movement destination partial color space and adjustment object color space of processing objects in one embodiment of a color adjustment method according to the invention.
Figure 1:
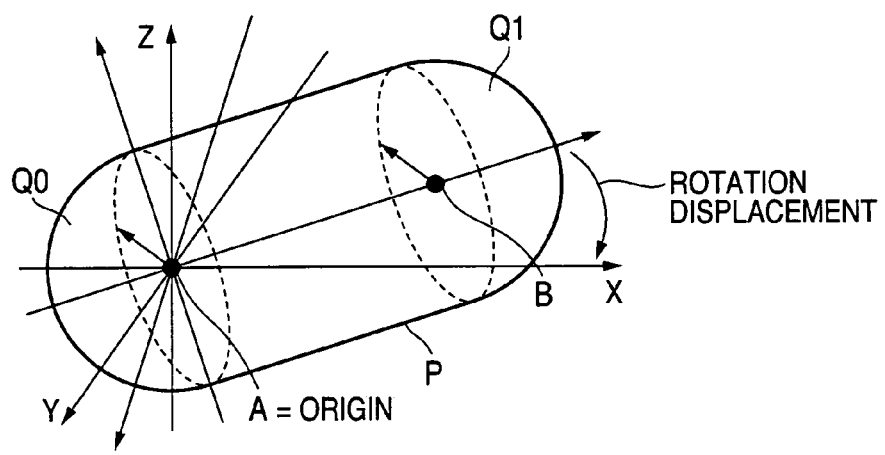
Figure 1:
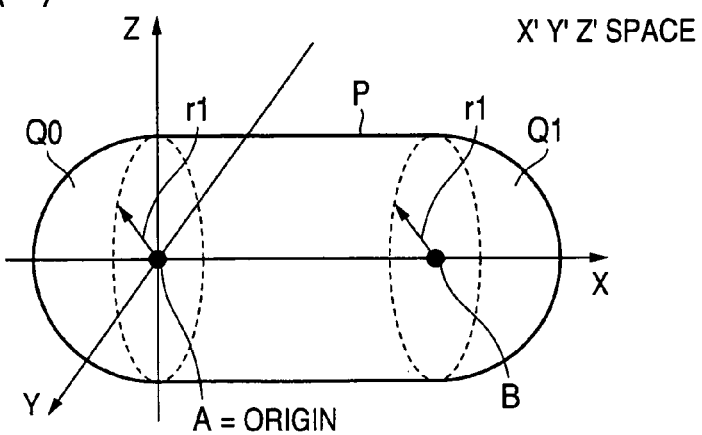

FIG. 1 is a diagram describing a relation among movement source partial color space P1, movement destination partial color space P2 and adjustment object color space P0, which are processing objects in one embodiment of a color adjustment method according to the invention. Partial color adjustment of a closed region Q0 (movement source partial color space P1) corresponding to the movement source partial color space P1 centered about coordinates A (X0, Y0, Z0) to a closed region Q1 (movement destination partial color space P2) corresponding to the movement destination partial color space P2 centered about coordinates B (X1, Y1, Z1) is considered. Here, the center of the movement source partial color space P1 is coordinates of a point of a representative color representing colors of the movement source partial color space P1. The center of the movement destination partial color space P2 is a target color of the color adjustment and is coordinates of a point to which the center of the movement source partial color space P1 is transformation-processed and displaced.

Preferably, each the center, which is the representative color of the movement source partial color space P1 or the target color of the movement destination partial color space P2, is defined properly according to its region shape. For example, for a sphere, its center may be defined as the region center and for a cube or a rectangular parallelepiped, the center of gravity may be defined as its center. That is, coordinates of a point, which is in color space, having approximate balance according to the region shape is defined as the region center, preferably. Of course, the coordinates of the point have only to be coordinates of a point representative of a color of each the region, and is not necessarily the center or the center of gravity. For the sake of simplicity, description will be made below on a case where both of a radius r1 of the closed region Q0 and a radius r2 of the closed region Q1 are a sphere of a radius r (r1=r2=r) and reside in different regions on color coordinates as shown in FIG. 1. Incidentally, the drawing shows only a semi-sphere portion.

Since the closed regions Q0, Q1 reside indifferent regions on color coordinates, the coordinates A are not equal to the coordinates B. It is preferable that a conversion object region P, namely an object region of the partial color adjustment has a shape containing the movement source partial color space P1 including a color of an object of conversion processing and the movement destination partial color space P2 including a color having a corresponding color conversion coefficient. More preferably, the conversion object region P has a shape containing the movement source partial color space P1 and the movement destination partial color space P2 so that the movement source partial color space P1 and the movement destination partial color space P2 inscribe the conversion object region P. An example shown in the drawing is the maximum range of an inscribed region defined by spheres Q1, Q2 and a cylinder Q3 (a length of the cylinder is equal to a length of a line segment AB), which is parallel to a straight line connecting the coordinates A and B and is inscribed in the sphere Q1 and the sphere Q2. That is, the example is an approximately left half portion of the sphere Q1, the cylinder Q3 and an approximately right half portion of the sphere Q2 in FIG. 1. A shape of the conversion object region P is a shape like a capsule of the commonest medicine.

The shape of the movement source partial color space P1 or the movement destination partial color space P2 is not limited to a shape of the sphere as shown in the drawing and may be, for example, shapes of an ellipsoid, a cylinder, an elliptic cylinder, a rectangular parallelepiped, and a closed solid shape, which is not at least a torus shape. Also in these cases, it is preferable that the conversion object region P, namely the object region of the partial color adjustment has a shape containing and inscribing in the movement source partial color space P1 and the movement destination partial color space P2.

First, for simplicity of calculation, the closed regions Q0, Q1 are parallel moved in a state of maintaining a relative position relation between the closed regions Q0, Q1 so that the coordinates A of the closed region Q0 become the origin in three-dimensional space of (X, Y, Z) as shown in FIG. 1(A) Subsequent to this, the closed regions Q0, Q1 are rotationally moved in a state of maintaining the relative position relation therebetween so that a straight line connecting the coordinates A and B overlaps with the X-axis as shown in FIG. 1(B). When the parallel displacement and revolution displacement are performed thus, it shifts to a state as shown in FIG. 1(C). A shape of a solid corresponding to the conversion object region P shown in FIG. 1(C) is called a capsule body. In color adjustment of the embodiment, partial color adjustment is performed on the capsule body corresponding to this conversion object region P. Hereinafter, for the sake of convenience for explanation, a coordinate system in which the straight line connecting the coordinates A and B is set to the X-axis is called X'Y'Z' space.

In the revolution displacement, the X'Y'Z' space is rotated so that the coordinate axis matches with XYZ space. Incidentally, parallel displacement is unnecessary when the coordinates A are at the origin primarily, and revolution displacement is unnecessary when the straight line connecting the coordinates A and B is parallel to the X-axis. Also, when the conversion object region P is a rotation body whose centerline is the straight line connecting the coordinates A andB as shown in the present example, the Y'-axis and the Z'-axis are not determined uniquely. In this case, a constraint condition has only to be provided properly, for example, the Y'-axis is defined as an axis contained in a plane including the straight line connecting the coordinates A and B and the X-axis, and orthogonal to the X-axis.

Also, when a conversion object region orthogonal to the X'-axis has directionality like an ellipse, the major axis and minor axis are advantageously set to the Y'-axis and Z'-axis. Incidentally, revolution displacement can be implemented by matrix calculation of 3×3 matrix for three-dimensional space, and a method described in a textbook of elementary geometry of, for example, "shokabo, basic mathematics library 4, solid analytic geometry" may be used. Also, any of revolution displacement and parallel displacement may be processed precedently.

By performing revolution displacement or parallel displacement thus, movement calculation of coordinates within the conversion object region P (the capsule body in the example of the drawing) associated with actual partial color adjustment can be simplified extremely. Also, it is necessary to perform return to the original coordinate system after performing these movements. However, the revolution displacement or the parallel displacement has been performed. Therefore, the return may be performed in order of inverse transformation of the revolution displacement and inverse transformation of the parallel displacement.

Figure 2:
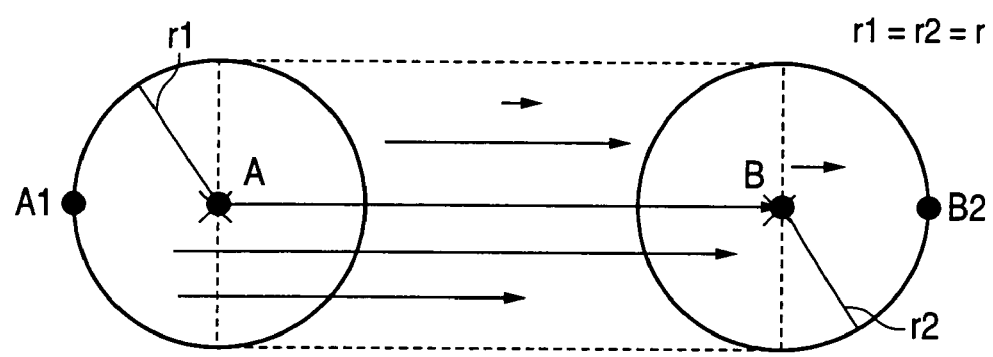
FIGS. 2(A)-2(B) are diagrams describing weighting at the time of color adjustment.
Figure 2:
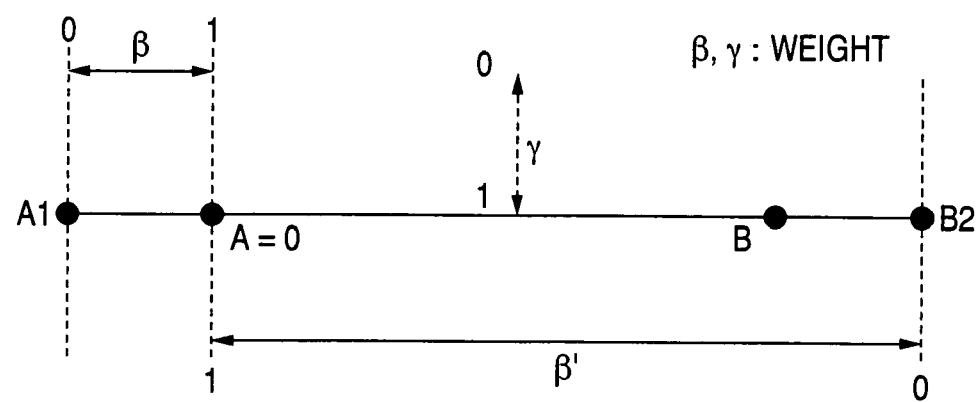

FIG. 2 is a diagram describing weighting at the time of color adjustment. Here, FIG. 2(A) is a diagram for two-dimensionally displaying the capsule body shown in FIG. 1(C) and illustrating movement of color coordinates.

In color adjustment, color coordinates may be moved on coordinate space. For example, as shown in FIG. 2(A), the inside of the capsule body shown in FIG. 1(C) is moved toward a target (memory color) B so that the point A overlaps with the point B and a surface of the capsule body corresponding to the boundary of a movement region moves little or preferably does not move at all (the amount of movement is "0"). Also, the amount of movement is decreased with points nearer to the surface of the capsule body corresponding to the boundary of the movement region. Also, the movement of the color coordinates can be expressed as movement from the point A to the point B. Therefore, the movement of the color coordinates can be described as a vector and this is called a movement vector. Weight to a movement vector AB becomes weight as shown in FIG. 2(B) when a movement object region has the simplest cylinder shape. Next, for simplicity of mathematical description, description will be made on a case where a shape of the conversion object region P is a cylinder shape.

Figure 3:
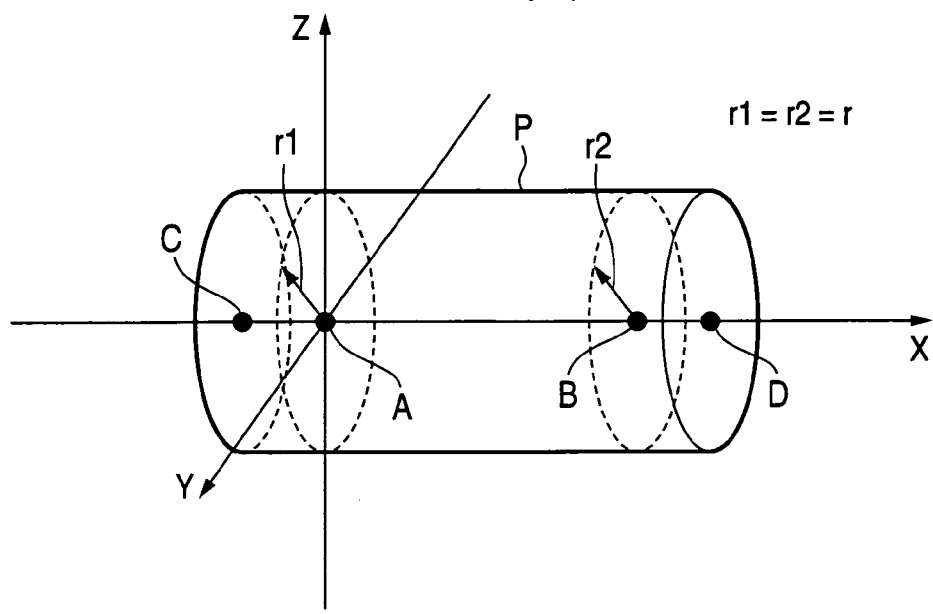
FIGS. 3(A)-3(C) are diagrams describing color adjustment of the case that a shape of a conversion object region is a cylinder shape.
Figure 3:
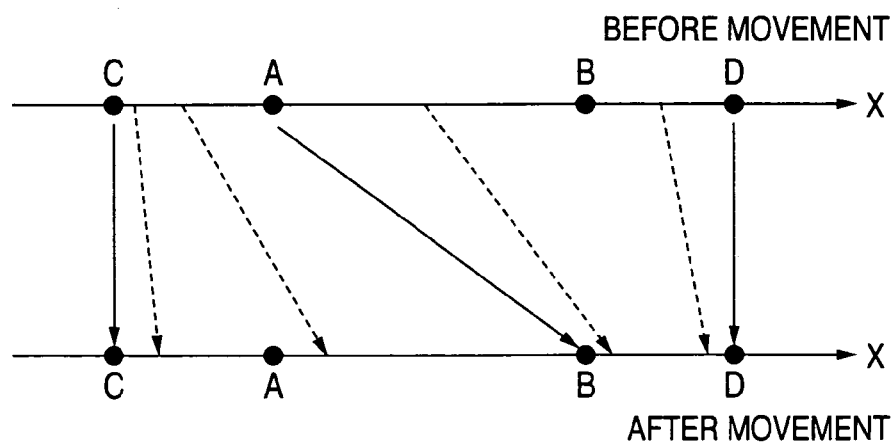
Figure 3:
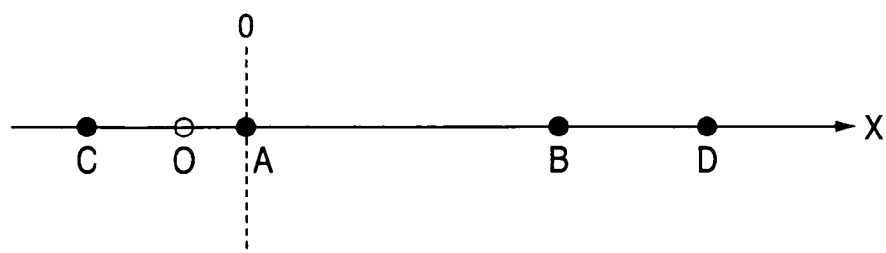

FIG. 3 is a diagram describing color adjustment of a case where a shape of the conversion object region P is a cylinder shape. It is assumed that a point C and a point D are defined as an adjustment range as shown in FIG. 3(A). First, a movement vector on the X-axis is considered.

FIG. 3(B) shows a relation between states before movement and after movement on the X-axis. It is assumed that a point A is moved to a point B and also a point C and a point D located in the boundary of the conversion object region P do not move. If the point C and the point D move, this fact means that a gradation step or a step of a color occurs in the boundary between the adjustment object region P and a region other than the object region P. Also, arrows by solid lines showing movement on the X-axis shown in the drawing indicate movement of the points A, B, C and D. Arrows by broken lines indicate movement on the X-axis other than the points. A condition that gradation inversion or inversion of a color does not occur by movement of the inside of the conversion object region P is that the arrows by solid lines and the arrows by broken lines do not intersect. That is, regarding the x-axis, a functional relation for generating such a movement vector may be generated. An example of this function is shown below. A coefficient related to the movement vector corresponds to a coefficient for making color conversion.

As shown in FIG. 3(C), it is assumed that a point X is set on a section CD. A point A is set to the origin. It is divided into two regions at the point A and is set to a section CA and a section AD. When X resides in the section CA, a movement vector can be determined by a formula (1). CX denotes a distance between point C and point X, and AC denotes a distance between point A and point C, and "↑AB" denotes a vector from point A toward point B, and "↑P" denotes a movement vector at point X.

$$\uparrow P = CX/AC \cdot \uparrow AB \qquad (1)$$

When X resides in the section AD, a movement vector can be determined by a formula (2). DX denote a distance between point D and point X, and AD denotes a distance between point A and point D, and "↑AB" denote a vector from point A toward point B, and "↑P" denote a movement vector at point X.

$$\uparrow P = DX/AD \cdot \uparrow AB \quad (2)$$

Also, when a position vector of the point X is set to "↑AX" and a position vector after movement is set to "↑AY", a formula (3) is obtained.

$$\uparrow AY = \uparrow AX + \uparrow P \quad (3)$$

The above means that the movement amount or the movement vector in which gradation inversion does not occur can be obtained by the division at a movement object point A. Also, CX/AC in the formula (1) or DX/AD in the formula (2) is a value converging from "0" to "1" and the movement amount at the point X is the simplest relation. However, for example, the movement amount at the point X may be $(CX/AC)^2$ or $(CX/AC)^{1/2}$. Also, as long as a monotone relation is used even in a case that a function is not used particularly, for example, a technique in which data is stored in a table format and the intermediate portions are interpolated may be used.

The above describes a movement rule of one dimension on the X-axis. Actually, the point X is an arbitrary point in the inside of an adjustment object region. When a coordinate value of the point X is set to (x, y, z), since the adjustment object region P is a rotation body whose rotation axis is the X-axis, weight β can be calculated as shown in a formula (4) where R denotes a distance from (x, 0, 0) to (x, y, z) and r denotes a radius of the adjustment object region P.

$$\beta = 1 - R/r \quad (4)$$

Also in this formula (4), modifications similar to those of the above description on the X-axis can be made, for example, $(1-R/r)^2$. Here, description will be made on a relation between the weight β and the formula (1) or formula (2). The formula (1) and formula (2) are combined and expressed as a formula (5).

$$\uparrow P = \alpha \cdot \uparrow AB \quad (5)$$

for C≦x<A, α=CX/AC
for A≦x≦D, α=DX/AD

The formula (5) is described as a relation formula on the X-axis. However, a movement vector can be obtained at an arbitrary point X by ignoring elements of y and z. In this case, a movement vector at an arbitrary point of the inside of the adjustment object region can be expressed as a formula (6).

$$\uparrow P = \alpha \cdot \beta \cdot \uparrow AB \quad (6)$$

The above is the description of the case of the cylinder shape. When the end face orthogonal to the X-axis of the adjustment object region is a plane, an idea similar to the cylinder can be applied. Also, when a sectional shape is an ellipse etc. and it is not a rotation body, it is obvious that AC and AD can be obtained similarly.

Figure 4:
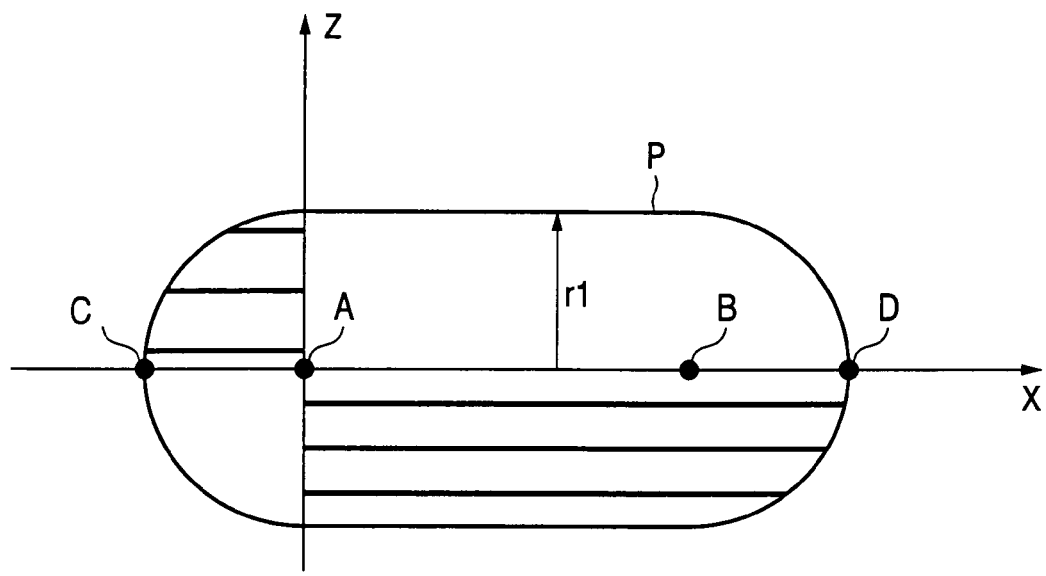
FIG. 4 is a diagram describing color adjustment in the case that an adjustment object region has a capsule shape.

FIG. 4 is a diagram describing color adjustment in a case where the adjustment object region P has the capsule shape. In an illustrated example, AC and AD are illustrated in the X-Z plane, and thick solid lines represent an example of AC (the left of A) and AD (the right of A).

In the capsule shape, process becomes complicated somewhat than the case of the cylinder shape. However, an idea similar to the cylinder shape can be applied there to. Also in this case, the adjustment object region P is a rotation body. Therefore, a coordinate value of a point X within the region is set to (x, y, z) and in the adjustment object region, a distance from (x, 0, 0) to (x, y, z) is set to R and a radius of the adjustment object region P is set to r. AC in the formula (1) and AD in the formula (2) change according to R.

The above description mentions a principle of performing movement smoothly without causing gradation inversion within the adjustment object region even when the movement source partial color space P1 and the movement destination partial color space P2 are not in an inclusive relation. When a partial color adjustment is performed, particularly when a pictorial image is an object thereof, it is important that gradation inversion is not caused and boundary of the color-adjusted image is smooth. The present method fits this requirement.

In the above example, the case that the movement source partial color space P1 and the movement destination partial color space P2 are in a congruent relation is described. However, they may be in a similar relation.

Figure 5:
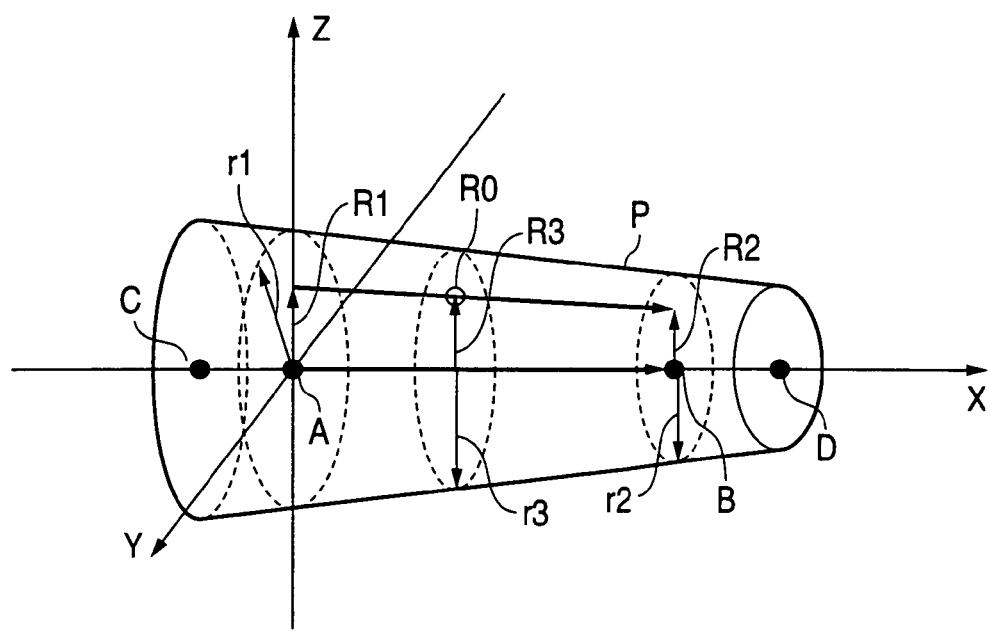
FIG. 5 is a diagram describing color adjustment in the case that the movement source partial color space and the movement destination partial color space are in a similar relation.

FIG. 5 is a diagram describing color adjustment in a case where the movement source partial color space P1 and the movement destination partial color space P2 are in a similar relation. It is assumed that a radius from the X-axis to a boundary of the adjustment object region, which is orthogonal to the X-axis and includes A, is r1, a radius from the X-axis to a boundary of the adjustment object region, which is orthogonal to the X-axis and passes through B is r2, a radius from the X-axis to a boundary of the adjustment object region, which is orthogonal to the X-axis and passes through a point R0 is r3, and a distance between the X-axis and the point R0 is R3.

In an illustrated example, both of the movement source partial color space P1 and the movement destination partial color space P2 have shapes of circular truncated cones. In the case of the congruent relation, r1=r2. However, in the case of the similar relation, r1≠r2. Because of this, difference is in that it is necessary to change a direction of a movement vector with depending on the point R0 and strictly depending on R3. The direction of the movement vector is determined as follows.

First, R1 and R2 are be determined so as to satisfy R3/r3=R1/r1=R2/r2. Also, when a movement vector determined by the point R0 is expressed as "↑A'B'", the X-axis and "↑A'B'" are appropriately determined so as not to become a skew position and therefore, "↑A'B'" can be determined uniquely. Also, magnitude of the movement vector before multiplication of coefficients of α and β is regardless of a position of the point R0 and a distance of "↑A'B'" in the X-axis direction should be expressed as |AB|. This vector is called a fundamental movement vector. The fundamental movement vector can be regarded as a function of the point R0. When the fundamental movement vector is expressed as "↑F(x)", a movement vector "↑P" can be obtained by a formula (7).

$$\uparrow P = \alpha \cdot \beta \cdot \uparrow F(x) \quad (7)$$

According to the above, even when the movement source partial color space P1 and the movement destination partial color space P2 are in the similar relation, difference is only in that a direction of the fundamental movement vector becomes a function of x and basically. With regard to other points, this case does not differ from the case that the movement source partial color space P1 and the movement destination partial color space P2 are in the congruent shape.

The above is the description of the case that the adjustment object region is the rotation body. However, the adjustment object region can be handled in a manner similar to the congruent and/or similar shapes of the rotational object, for example, even when the movement source partial color space P1 and the movement destination partial color space P2 are not the rotational object such as an ellipsoid. Although detailed description is omitted, the radius r, the distance R and the point R0 (x, y, z) should be a function of elements y, z of a point X in the case of congruence and this function should expand to a function of three elements x, y, z in the case of similarity. Also, in the description, the fundamental movement vector and the coefficients α, β are described by the simplest function. However, this is one example.

As long as the fundamental movement vector is determined so as not to intersect, determination methods other than the above may be used. Also, concerning α and β, the product of both of α and β can be regarded as a coefficient, which is multiplied the fundamental movement vector. Finally, color coordinates after movement are determined by the formula (3). From this point of view, a method for determining α and β so that orders of sequence of points before movement and orders of sequence of points after movement on a certain fundamental movement vector is not inverted, or a method for determining a coefficient corresponding to α·β directly may be used.

When color adjustment is performed on the conversion object region P by the method as described above, the inside of the conversion object region P is moved toward a target so that coordinates of the adjustment object overlap with coordinates of a point after movement and the boundary of the movement region moves little or does not move at all. Therefore, a phenomenon such as a color jump or gradation inversion occurs little in the boundary between the adjustment object region and the outside thereof. That is, maintenance of gradation continuity of an image of a color adjustment object and prevention of color inversion can be combined to make partial color adjustment. It is not necessary that movement amount at the boundary between the adjustment object region and the outside thereof is zero strictly. An error is allowed to an extent that one does not recognize adjacent differences visually (substantially color difference ΔE is about 0.5). Furthermore, when the adjustment is performed, it is apparent that smooth change in gradation occurs from the inside of the adjustment object region to the boundary thereof. Even if gradation difference, which does not exceed an amount of the change in gradation, takes place at the boundary between the adjustment object region and the outside thereof, no problem is caused with regard to the image quality. According to the above consideration, it is not necessary that movement amount at the boundary between the adjustment object region and the outside thereof is zero strictly. That is, the movement amount at the boundary may be substantially zero.

In preferable reproduction, reproduction of a memory color is important. In the case of making selective color adjustment for changing only a particular color of color space, the above technique is very effective. For example, if a manuscript is analyzed and a particular color region, for example, flesh color can be changed to a certain color (memory color), added value can be provided in preferable reproduction. Also, the above technique has an advantage capable of being applied to the case of desiring to move a color locally in color space, for example, correction of a white point.

In a method according to the related art, for example, a technique of selective color adjustment from a large ellipsoid to as mallellipsoid residing in a region (which is in an inclusive relation) fully included in this large ellipsoid on color space has been proposed. However, there is a problem that movement of a position relation, which is not in the inclusive relation, cannot be performed or when tone adjustment is made forcibly, gradation inversion occurs in principle. On the contrary, according to the above technique, constraint of the inclusive relation is eliminated, for example, byhandling only the inside of the conversion object region P defined by a region connecting sphere-shaped movement source partial color space P1 to similarly sphere-shaped movement destination partial color space P2 as an adjustment object color space P0.

As a result of this, for example, the center and a radius of a color, which is desired to be moved, and/or the center and a radius of a movement destination are given independently and flexibility in adjustment increases. Thereby, a selective color adjustment function with a high degree of flexibility can be provided. In a case of moving coordinates of a particular region to a certain region in the inside of color space, a step of the boundary between the moved region and a region, which is not moved, can be considered. Therefore, image quality defects such as false contouring or gradation inversion after movement hardly occur. Incidentally, concerning a shape of the region, flexibility of an ellipsoid is higher than that of a sphere. However, it is difficult to obtain a general solution arithmetically.

Next, concerning partial color adjustment effective in ground removal etc. in image data, its principle will be described. For a printed matter etc., a ground in image data refers to a portion corresponding to paper to which ink does not attach. For an image, which is not generated digitally like CG (Computer Graphics), a portion, which should be a ground essentially, may have a certain degree of variations, for example, when a manuscript or a scene is obtained through an image pickup system. Hereinafter, this method is called convergence type partial color adjustment in order to make a distinction from the partial color adjustment described above.

Figure 6:
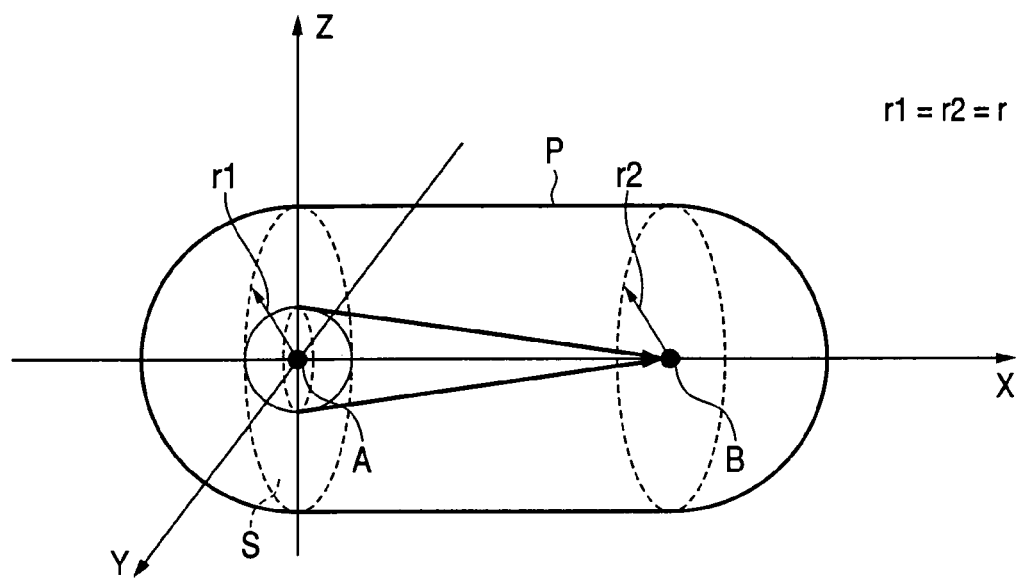
FIGS. 6(A)-6(B) are diagrams describing convergence type partial color adjustment.
Figure 6:
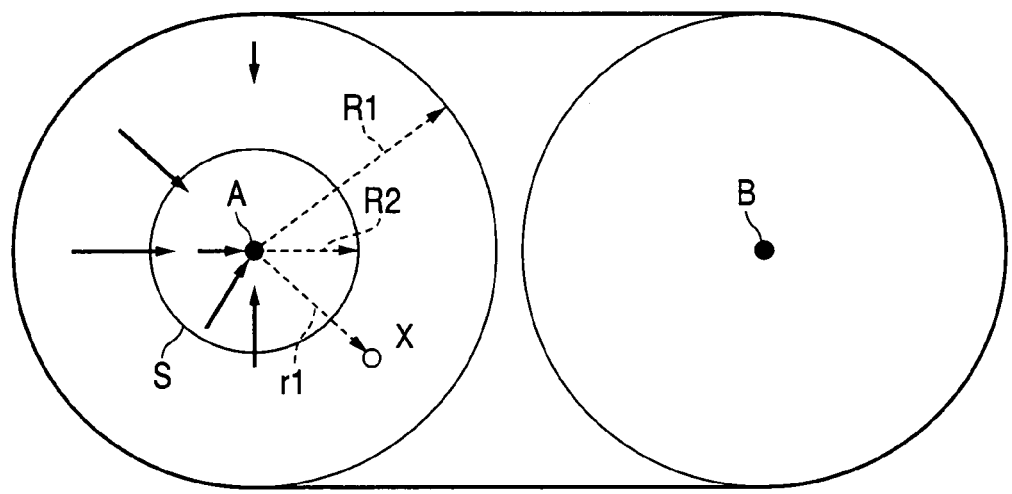

FIG. 6 is a diagram describing convergence type partial color adjustment. Performing the convergence type partial color adjustment in FIG. 6(A) means that all the points inside a region of a small sphere S centered on a point A in FIG. 6(A) are moved to one point of a point B and partial color adjustment is made to the outside of the sphere S with continuity maintained. This sphere S is called a convergence region. Incidentally, as described above, a sphere outside the sphere S in the drawing and a boundary being further outside thereof are color-converted by the above described partial color adjustment, without causing gradation discontinuity and color inversion at the boundary. It is assumed that a range of variations of a ground is within the sphere S, movement in which all the grounds can be made a constant value and continuity of a color of its vicinity can be maintained is considered. Division of convergence type partial color adjustment into two stages facilitates understanding.

It is assumed that a small sphere centered on a point A is S, a radius of this sphere S is R2, a radius of a large sphere (movement source partial color space P1) centered on the point A is R1, and a point to be performed movement, which is included in this large sphere, is X, and a distance from A to X is r as shown in FIG. 6(B). If r<R2, X should be set to a coordinate value of the point A unconditionally. In a region of R2≦r≦R1, a direction of a step 1 fundamental movement vector (called thus in order to make a distinction from the fundamental movement vector of the partial color adjustment described) is a vector from the point X toward the point A and the length thereof is a distance from the point X to the point A. When this step 1 fundamental movement vector is expressed as "↑V1", the step 1 movement vector "↑V" can be obtained by a formula (8).

$$|V|=\gamma \cdot \uparrow V1 \quad (8)$$

$$\gamma=1-(r-R2)/(R1-R2)$$

In the formula (8), weight γ is expressed by a simple function. However, γ may be expressed as a desired function so long as the following rules are satisfied. A first rule is that γ takes "1" when the point X is on a surface of the sphere S, that γ takes "0" when the point X is on a surface of the movement source partial color space P1, and that γ changes monotonously between the surface of the sphere S and the surface of the movement source partial color space P1. Before description on a second rule, several geometric conditions are given below. Sequence of points X0, X1, X2, ..., Xn can be defined from the point A to the surface of the movement source partial color space P1, on an optional radius R1. When distances from the point A to the points X0, X1, X2, ..., Xn are expressed as DX0, DX1, DX2, ..., DXn, relation of DX0≦DX1≦DX2≦ ... ≦DXn is apparent. Further assuming that sequence o points after movement of X0, X1, X2, ..., Xn are expressed as X0', X1', X2', ..., Xn', and distances from the point A to sequence of points aftermovement are expressed as DX0', DX1', DX2', ..., DXn'. The second rule is that relation of DX0'≦DX1'≦DX2'≦ ... ≦DXn' is still satisfied after the movement. Relationship between before and after movement is mathematically described above. However, this description means nothing less than that gradation inversion and/or color inversion don't occur.

It is assumed that a position vector of the point X is "↑AX" and a position vector after movement is "↑AZ". A destination to which the point X is moved is expressed by a formula (9). Incidentally, the point A is parallel moved to the origin in a manner similar to the case of the partial color adjustment and is a "↑0" vector.

$$AZ=AX+V(R2 \leq r \leq R1)$$

$$AZ=0(r<R2) \quad (9)$$

Also, "↑AZ" to which "↑AX" is moved thus is expressed as a point R0'. When this point R0' has been obtained, the first stage is completed. In the second stage, the movement identical to the partial color adjustment described above should be performed with respect to the point R0'. This two-stage processing is described in a combined form as a formula (10).

$$\uparrow AY = \uparrow AZ + \uparrow P \quad (10)$$

The above is the description of the principle of the convergence type partial color adjustment. Since an applied portion of this convergence type partial color adjustment is a portion of the inside of the original conversion object region P, a phenomenon such as a color jump or gradation inversion occurs little in the boundary portion to the outside of the adjustment object region as described above.

Also, the cases are described in which color space of an object has multi-dimensions in both of the partial color adjustment and the convergence type partial color adjustment. However, this embodiment can also be applied to so-called one-dimensional color space like a monochromatic image.

Figure 7:
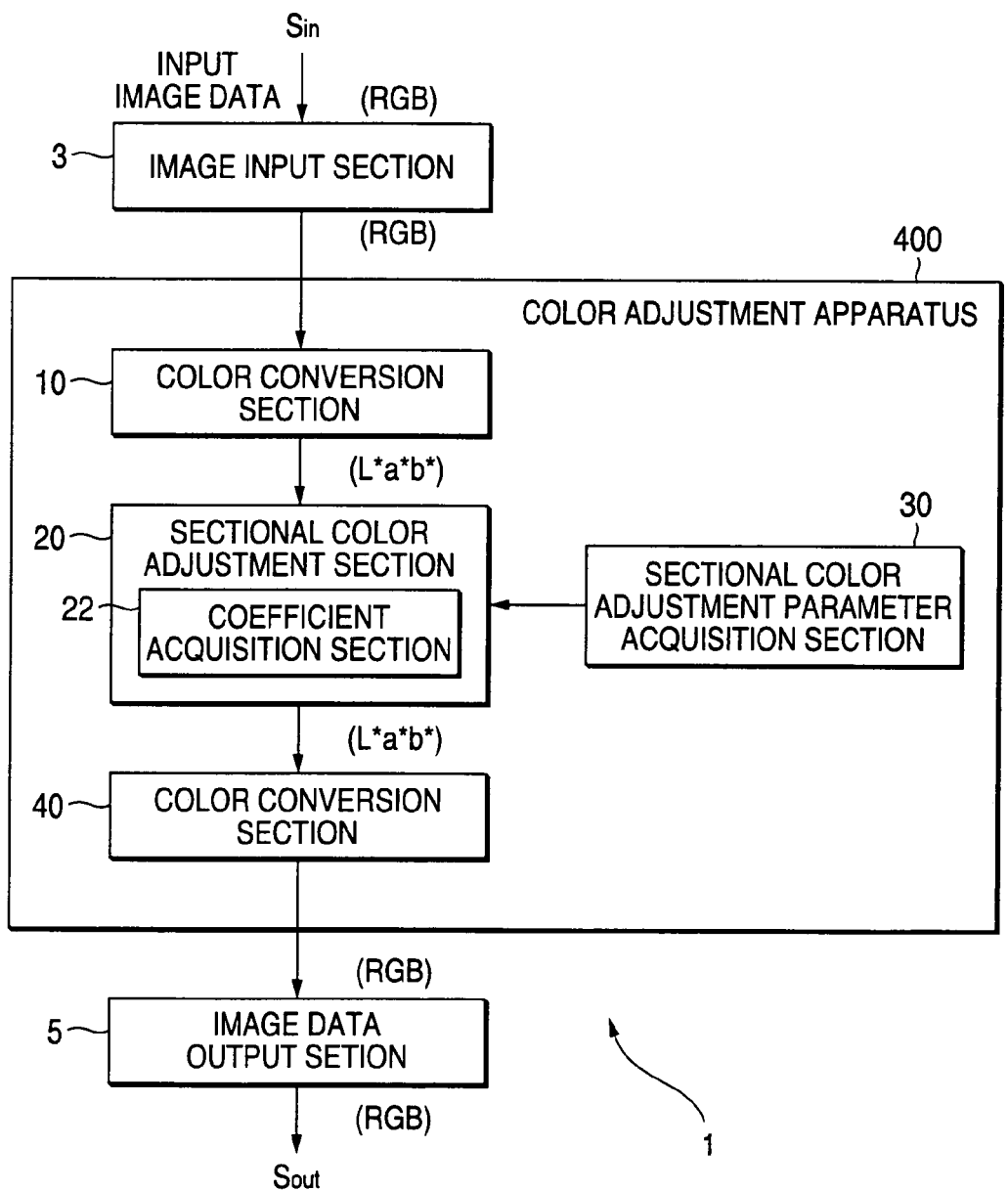
FIG. 7 is a block diagram showing one embodiment of an image processing apparatus for implementing a partial color adjustment method.

FIG. 7 is a block diagram showing one embodiment of an image processing apparatus for implementing the partial color adjustment method described above. As described above, color space on which the partial color adjustment is performed may be any color space. However, in the embodiment, L*a*b* color space defined by CIE is used. It is noted that the invention is not limited to this embodiment. For example, a color signal on device-dependent color space such as display RGB or scanner RGB using red R, green G and blue B (called RBG in combination) or device-independent color space, which is color space independent of a device of L*u*v* representation defined by CIE can also be used. Of course, in a partial color adjustment section 20, any of various device-dependent color space or various device-independent color space other than the above may be handled as a signal of a color adjustment object.

An image processing apparatus 1 of the embodiment includes an image input section 3, a color conversion section 10, a partial color adjustment section 20, and a partial color adjustment parameter acquisition section 30. The image input section 3 acquires input image data expressed by, for example, RGB color space. The color conversion section 10 converts a color signal Sin of the input image data into a color signal on L*a*b* space. The partial color adjustment section 20 is one example of a color coordinate movement section for performing partial color adjustment by moving color coordinates as described above with respect to coordinates of each point of the inside of a conversion object region P defined by movement source partial color space Pl and movement destination partial color space P2. The partial color adjustment parameter acquisition section 30 is one example of a movement parameter setting section for setting movement parameters in the partial color adjustment section 20.

Also, the image processing apparatus 1 includes a color conversion section 40 and an image data output section 5. The color conversion section 40 converts the color signal on the L*a*b* space, on which the color adjustment is performed by the partial color adjustment section 20, to a color signal of original RGB color space. The image data output section 5 outputs the color signal from the color conversion section 40 toward an external image output device such as a printer, a CRT or an LCD (Liquid Crystal Display).

One embodiment of a color adjustment apparatus 400 according to the invention includes the color conversion section 10, the partial color adjustment section 20, the partial color adjustment parameter acquisition section 30 and the color conversion section 40.

Since the color conversion processing performed in the color conversion sections 10, 40 is the public known art, detailed description is omitted. The partial color adjustment section 20 has a coefficient acquisition section 22 for acquiring a color conversion coefficient. This coefficient acquisition section 22 acquires a vector showing movement of color coordinates as the color conversion coefficient as described above.

Prior to actual partial color adjustment, parameters regarding partial color adjustment are acquired by the partial color adjustment parameter acquisition section 30. Parameter acquisition will be described later. The parameters regarding partial color adjustment are set to the partial color adjustment section 20. Also, a color conversion coefficient for converting an input image into an L*a*b* color signal is set to the color conversion section 10.

Also, when the color conversion section 40 sets inverse transformation of the color conversion by the color conversion section 10, an output image obtained finally becomes an image in which only a change by partial color adjustment is made. Also, when an output to a printer is produced after performing the partial color adjustment, a color conversion coefficient for performing conversion into a color signal such as CMYK for printer may be set. When an L*a*b* image signal after the partial color adjustment wants to be left, processing in which color conversion by the color conversion section 40 is not performed can be selected and a proper color conversion coefficient may be set.

After completing preparation as above, the input image is converted into the L*a*b* color signal by the color conversion section 10 in order of pixels. In the next partial color adjustment section 20, if the L*a*b* color signal is inside an adjustment object region P, desired adjustment is performed to output the adjusted L*a*b* color signal. If not, the L*a*b* color signal input to the partial color adjustment section 20 is output as it is. Details of an internal operation of the partial color adjustment section 20 will be described later. Next, desired color conversion is performed by the color conversion section 40 and output image data is generated. This output image data is output to a display device or a printer through the image data output section 5.

Figure 8:
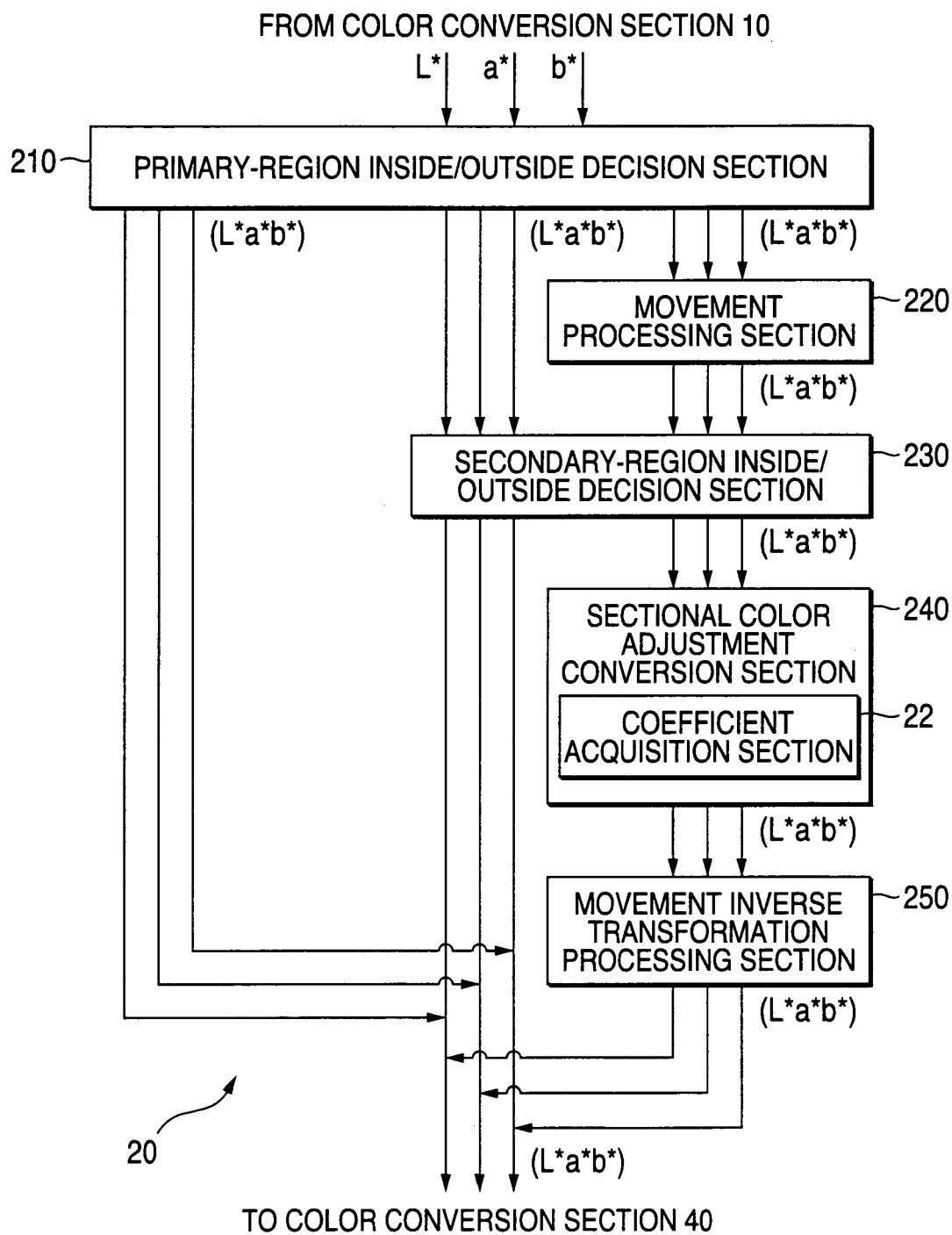
FIG. 8 is a block diagram showing a detailed configuration example of a partial color adjustment section in the image processing apparatus.

FIG. 8 is a block diagram showing a detailed configuration example of the partial color adjustment section 20 in the image processing apparatus 1 of the embodiment. As shown in the drawing, the partial color adjustment section 20 has a primary-region inside/outside decision section 210 and movement processing section 220. The primary-region inside/outside decision section 210 decides whether pixel data shown by the L*a*b* color signal input from the color conversion section 10 is in the inside or the outside of a primary region. The movement processing section 220 performs predetermined parallel displacement or revolution displacement with respect to the pixel data decided that it is in the inside (may include the boundary) by the primary-region inside/outside decision section 210. The L*a*b* color signal on which movement processing is performed by the movement processing section 220 is hereinafter called an (L*a*b*) 1 color signal. Also, The L*a*b* color signal on which the parallel displacement or revolution displacement is not performed is hereinafter called an (L*a*b*) 0 color signal. The parallel displacement or revolution displacement using the primary region as an object is movement in three-axis space of L*a*b* and a well-known technique may be used. Its detailed description is omitted herein.

Also, the partial color adjustment section 20 further includes a secondary-region inside/outside decision section 230, a partial color adjustment conversion section 240, and a movement inverse transformation processing section 250. With respect to the (L*a*b*) 1 color signal from the movement processing section 220 in which the parallel displacement or revolution displacement is performed and the (L*a*b*) 0 color signal from the primary-region inside/outside decision section 210 in which the parallel displacement or revolution displacement is not performed, the secondary-region inside/outside decision section 230 decides whether pixel data shown by each color signal is in the inside or the outside of the conversion object region P. The partial color adjustment conversion section 240 contains the coefficient acquisition section 22 for performing desired partial color adjustment based on a principle of the partial color adjustment described above. The movement inverse transformation processing section 250 performs inverse transformation of the revolution displacement or inverse transformation of the parallel displacement performed by the movement processing section 220.

The secondary-region inside/outside decision section 230 outputs the (L*a*b*) 0 color signal from the primary-region inside/outside decision section 210 as it is to the color conversion section 40, when result of the inside/outside decision is the outside. On the other hand, the (L*a*b*) 1 color signal from the movement processing section 220 is output to the partial color adjustment conversion section 240 when the result of the inside/outside decision is the inside (may include the boundary portion). The partial color adjustment conversion section 240 performs desired partial color adjustment based on the principle of the partial color adjustment and outputs the adjusted L*a*b* color signal to the movement inverse transformation processing section 250. The movement inverse transformation processing section 250 performs inverse transformation of the revolution displacement or inverse transformation of the parallel displacement, which have been performed by the movement processing section 220, and outputs the L*a*b* color signal to the color conversion section 40 of the next stage.

Figure 9:
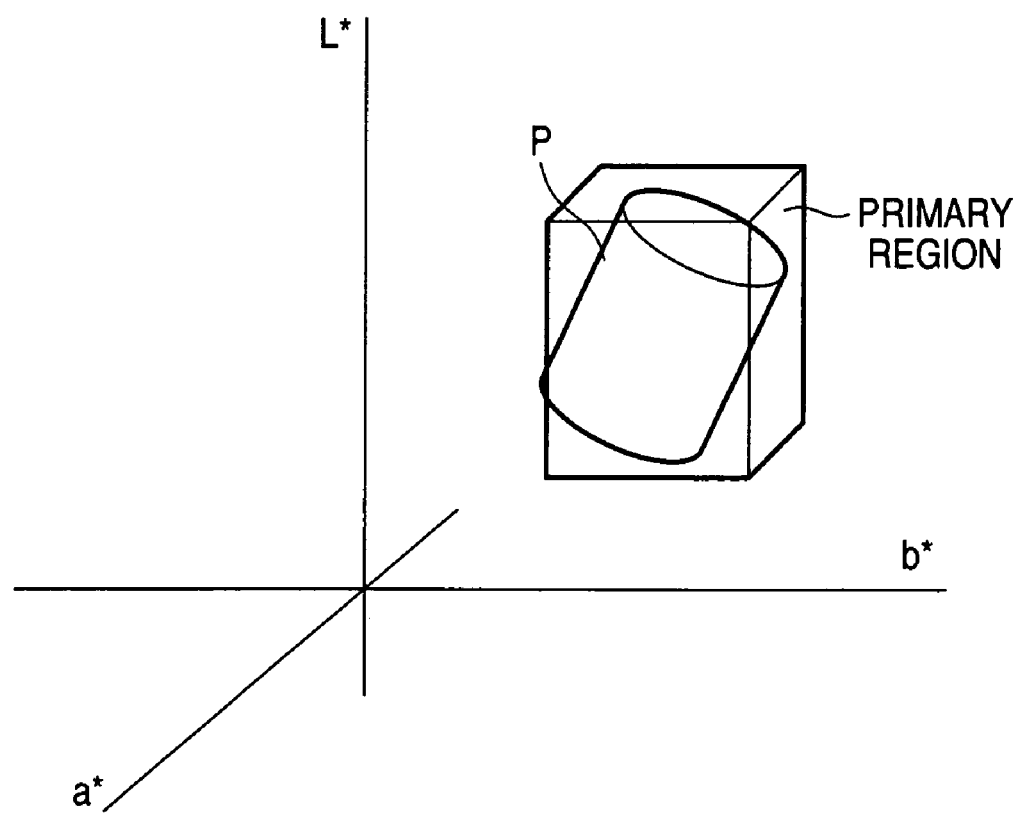
FIG. 9 is a diagram describing a primary region handled by a primary-region inside/outside decision section.

FIG. 9 is a diagram describing the primary region handled by the primary-region inside/outside decision section 210. In the drawing, input color space is shown by each axis of L*, a*, b* and a cylinder shows a state of an adjustment object region (conversion object region) P before performing parallel displacement and revolution displacement. A rectangular parallelepiped approximately fully including this cylinder and being parallel to each axis of L*, a*, b* is obtained and this is set to a primary region. This rectangular parallelepiped includes the cylinder-shaped adjustment object region P, and is preferable to be as small as possible. The primary-region inside/outside decision is a decision as to whether or not the L*a*b* color signal is in the inside of the rectangular parallelepiped. The inside/outside decision on such a rectangular parallelepiped is very simple and an effect of reducing processing time is great. When the result of this primary-region inside/outside decision is the outside, the primary-region inside/outside decision section 210 outputs the L*a*b* color signal, which is input from the color conversion section 10 to the partial color adjustment section 20, to the color conversion section 40 as it is.

Figure 10:
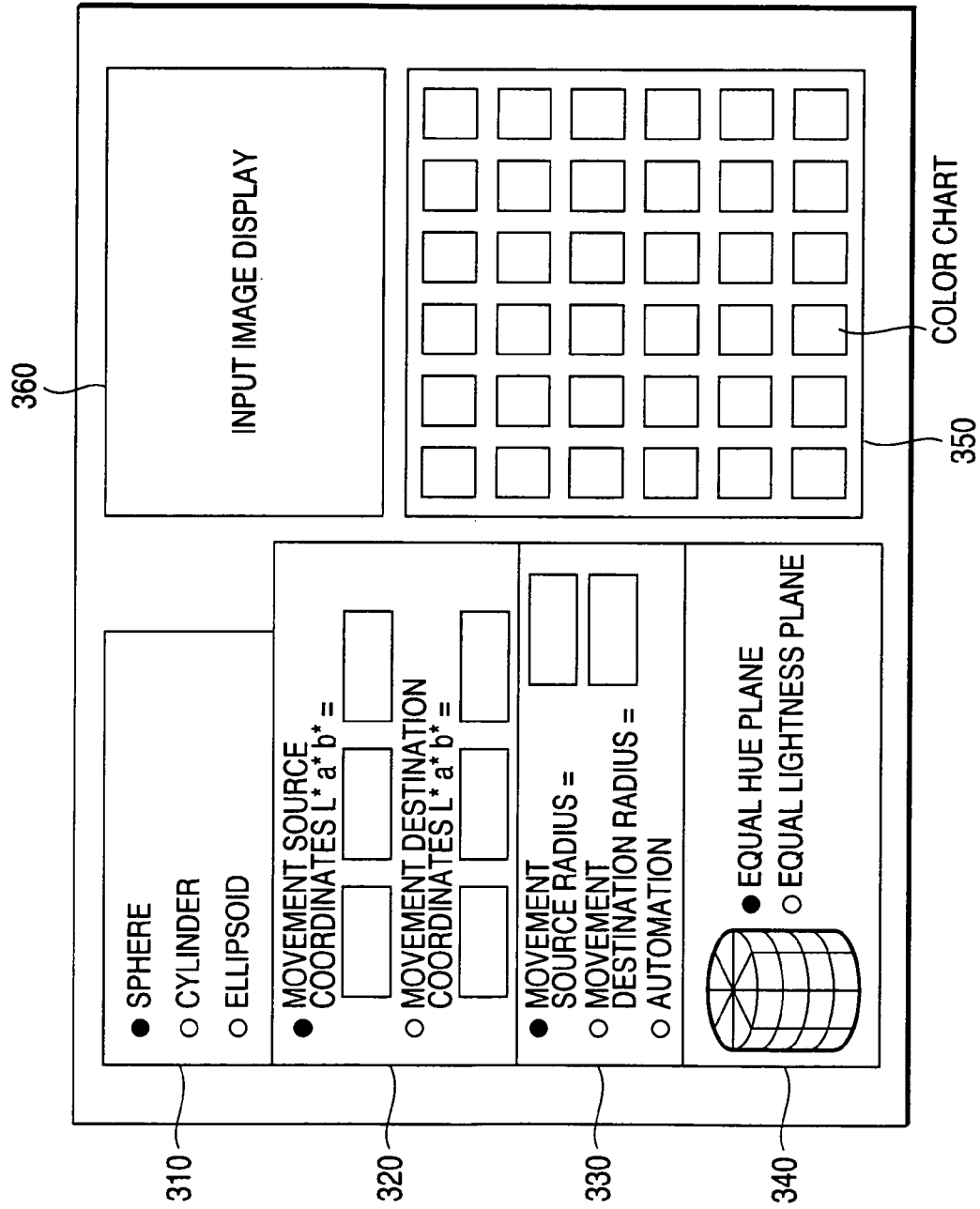
FIG. 10 is a diagram showing a user interface screen generated by a partial color adjustment parameter acquisition section in the partial color adjustment section.

FIG. 10 is a diagram describing one configuration example of the partial color adjustment parameter acquisition section 30, and shows a user interface screen. Parameters are acquired by an input of an operator from a user interface such as a keyboard or a mouse.

The partial color adjustment parameter acquisition section 30 identifies a shape of movement source partial color space P1 or movement destination partial color space P2 based on instructions from the operator. For example, the operator specifies the shape of the movement source partial color space P1 or the movement destination partial color space P2 and center coordinates according to this shape. On receiving this, the partial color adjustment parameter acquisition section 30 identifies each region shape. Based on this region information, the partial color adjustment section 20 identifies the conversion object region P and performs the partial color adjustment described above.

In order to receive user instructions for identifying such movement source partial color space P1 or movement destination partial color space P2, as shown in the drawing, a display screen has a dialog box 310, a dialog box 320, a dialog box 330, a dialog box 340, a color chart display region 350 and an image display region 360. The dialog box 310 receives specification of shapes of the movement source partial color space P1 and the movement destination partial color space P2. The dialog box 320 inputs center coordinates of the movement source partial color space P1 and center coordinates of the movement destination partial color space P2. The dialog box 330 inputs parameters related to the partial color adjustment dependent on the shapes of the movement source partial color space P1 and the movement destination partial color space P2. The dialog box 340 specifies color chart of L*a*b* color space. The color chart display region 350 displays the color chart. The image display region 360 displays an input image.

One of the parameters related to the partial color adjustment is a shape of the movement source partial color space P1 and a shape of the movement destination partial color space P2. The shapes of the movement source partial color space P1 and the movement destination partial color space P2 are selected by the dialog box 310 in the drawing. An initial value is a sphere.

The parameters related to the partial color adjustment dependent on the shapes of the movement source partial color space P1 and the movement destination partial color space are radii etc. of the movement source partial color space P1 and the movement destination partial color space P2 shown in the dialog box 330. In the drawing, the dialog box at the time of selecting a sphere is shown. When an ellipsoid is selected in the dialog box 310, the dialog box 330 switches to a dialog box for inputting radii of three directions. An initial value thereof is automation. When the automation is selected, in the case of a sphere, a radius is automatically determined so as to become half of a distance between center coordinates from a distance between center coordinates of the movement source partial color space P1 and center coordinates of the movement destination partial color space P2, which are determined later.

When an ellipsoid is selected, the ellipsoid is regarded as a sphere and the same process as automation at the time when the sphere is selected is performed. That is, the partial color adjustment parameter acquisition section 30 utilizes this dialog box 310 to specify a radius of a sphere when the shape of the movement source partial color space P1 and the shape of the movement destination partial color space P2 are the sphere and to specify a dimension of the shape corresponding to specifying a radius with respect to a sphere.

The residual parameters related to the partial color adjustment are center coordinates of the movement source partial color space P1 and center coordinates of the movement destination partial color space P2. A coordinate value of L*a*b* color space can be input directly by the dialog box 320 in the drawing. However, the coordinate value of L*a*b* color space is difficult to understand in a sense manner. Therefore, A predetermined color charts may be displayed on the color chart display region 350 in the drawing and an operator may make a visual check to click the color charts by an instruction member such as a mouse and thereby the coordinate value is acquired.

Incidentally, movement source coordinates of the dialog box 320 in the drawing refer to the center coordinates of the movement source partial color space P1, and movement destination coordinates refer to the center coordinates of the movement destination partial color space P2. Also, the dialog box 320 in the drawing shows a state in which an input of the movement source coordinates has been active. For an input from the color chart, in this example, coordinate values of its color chart in L*a*b* color space are displayed in the movement source coordinates and an operation for changing a part of the values can also be performed.

Also, since it is difficult to display all the color charts of the L*a*b* color space due to limitations of space, by clicking a portion of a color solid shown in the dialog box 340 in the drawing by a mouse, an equal hue plane or an equal lightness plane including the portion of the color solid is displayed as an actual color chart (the color chart display region 350 in the drawing). Data corresponding to this color chart is data of the L*a*b* color space. However, when the color chart is displayed, color conversion is made into a display RGB for display indication and display is performed. A display ICC (International Color Consortium) profile is used in this color conversion.

Generally, a display device cannot display a color thereon with high accuracy. Therefore, an input image, which is color converted into L*a*b* color space and thereafter is color converted with the same ICC profile as the color chart display, is displayed. That is, even when accuracy of matching between a display color of RGB color space on the display and an L*a*b* value is not very high, a user can compare the image with the color chart on the same condition.

Also, the center coordinates can be input by clicking on a display image. That is, an operator may click on the image or select the color chart to click. Also, when all the parameters are determined, the display image becomes display of an image in a case that partial color adjustment is performed thereon, by a preview button (not shown). When it is desired to return the display image to a state before the preview, the display image returns to the previous display image by a preview cancel button. After setting or completion of the preview, the setting is completed by clicking a setting completion button (not shown).

Also, a user interface screen related to convergence type partial color adjustment (not shown) can be selected. In this case, a dialog box for inputting a ratio of a size of a convergence region to that of the movement source partial color space P1 is only added to the partial color adjustment described above. The ratio of the sizes is in a range of "0" to "1".

The image processing apparatus 1 of the configuration described above receives user's specification and performs color adjustment. However, the invention is not limited to this. The image processing apparatus 1 may be a form of performing automatic adjustment. In this case, the parameter setting related to the partial color adjustment through a user interface by an operator becomes unnecessary. For example, preferable reproduction of a memory color is given as a case of the automatic adjustment. A flesh color of a person, blue of the sky, green of grass, etc. are called the memory color and there is a case that a color corresponding to center coordinates of the movement destination partial color space of an L*a*b* color signal has been found. In such a case, color distribution of an image is checked with reference to a three-dimensional histogramon color space of image data. When there is a color close to the memory color, the color is set to the center coordinates of the movement source partial color space P1 and a radius is determined from the distribution and partial color adjustment can be performed to approach preferable reproduction.

Particularly, a preferable method for partially color-adjusting a flesh color is to combine not only checking the color distribution but also face recognition technique for recognizing as to whether or not a face of a person exists in the image. Then, the partial color adjustment is applied so as to transform the center value of the flesh color in the image into preferable flesh color (target color).

Also, this becomes effective means for ground removal and the like. For example, when there is a manuscript and image data is acquired by an image pickup system such as a scanner or a digital camera, things such as white of paper or a color chart to be reproduced by a uniform color, namely things in which a pixel value of the image data should be a constant value sometimes have certain distribution (variations) actually. In order to make color information of a ground portion a constant value, the convergence type partial color adjustment described above is preferably applied to such image data.

Particularly, in a case of compressing image data in which variations occur in the image data to be uniform essentially, by performing this convergence type partial color adjustment, for example, a compression ratio may increase greatly. An effect thereof is great. Even in a case of applying this convergence type partial color adjustment, with respect to the original conversion object region P, a phenomenon such as a color jump or gradation inversion occurs little in the boundary portion outside the adjustment object region as described above.

Figure 11:
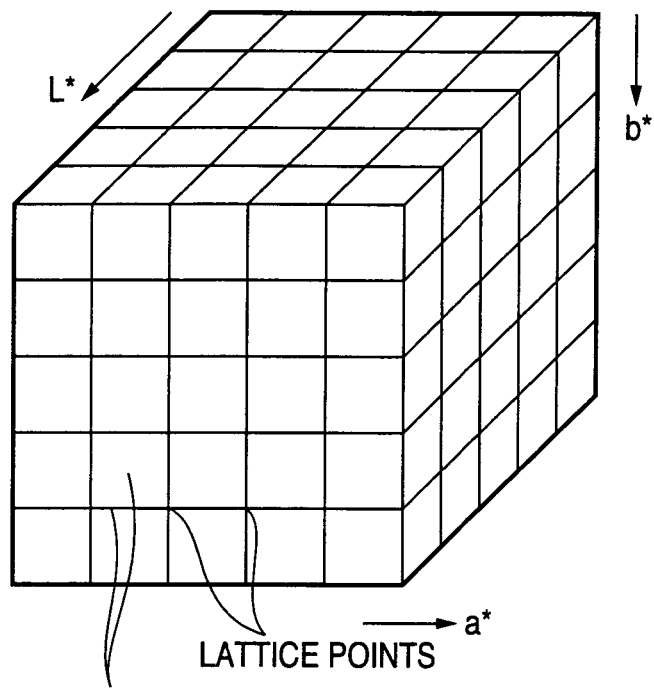
FIGS. 11(A)-11(B) are diagrams describing a color conversion definition for color conversion using the partial color adjustment method.
Figure 11:
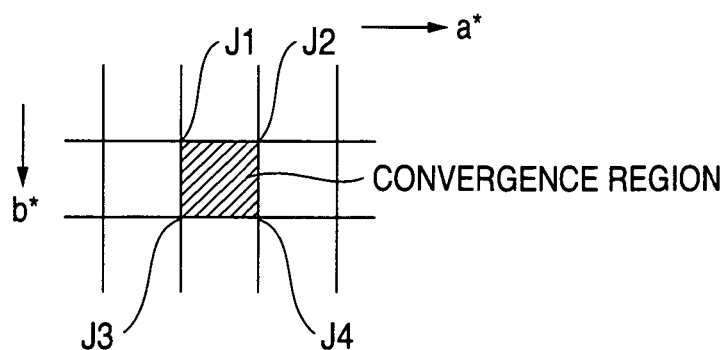

FIG. 11 is a diagram explaining a color conversion definition for color conversion using the partial color adjustment method described above. Here, the color conversion definition is synonymous with that expressed as the color conversion coefficient in the image processing apparatus 1.

The color conversion definition is a definition of correspondence from input color space to output color space, and refers to a definition, which is in a functional relation mathematically. Actually, the color conversion definition is a table value of a one-dimensional lookup table (LUT), a table value of a multi-dimensional LUT (DLUT; multi-Dimension LUT) and a value of matrix elements, and is implemented by their combination. These values are generically called a profile. The commonest example of the color conversion definition is an ICC profile enacted by an ICC. Particularly, DLUT is effective in combination with the partial color adjustment described above. The DLUT is constructed by regular lattice points of multi-dimensions (three dimensions in the drawing) using the input color space as an address, for example, as shown in FIG. 11(A). Values on the output color space corresponding to the lattice points are stored in the lattice points.

When an input value located at a lattice point enters, a value of the lattice point is set to an output value. On the other hand, when an input value located between lattice points enters, interpolation is conducted with reference to the neighbor lattice points to set the interpolated value to an output value. This is because there is no influence on the entirety even when the output value of a part of the lattice points is changed.

Here, when data value of the lattice point is changed, a color value of an output is changed. That is, when particular lattice point data of the lookup table is edited, color adjustment can be performed partially on only a particular color. Also, for example, when a convergence region including a plurality of lattice points such as lattice points J1, J2, J3, and J4 is set as shown in FIG. 11(B) and all the values of the lattice points in the inside of the region are set to be the same, the convergence type partial color adjustment described above can also be performed. That is, when all the points in the inside of the region centered on the lattice points J1, J2, J3, J4 in FIG. 11(B) are set to the same color value, all the input color values corresponding to the inside of the lattice points J1, J2, J3, J4 can be moved to the same color value and the other input color values are performed the partial color adjustment with maintaining continuity of a gradation in the boundary portion to the outside of an adjustment object region and preventing color inversion, by the partial color adjustment described above.

Incidentally, FIG. 11(B) shows a suitable example in a two-dimensional LUT, and a convergence region is a region defined by the lattice points J1, J2, J3, J4 forming a square lattice. However, the shape thereof is not necessarily a square and may be a rectangle. Also, the number of lattice points for defining the convergence region is not limited to "four" and should be at least "two" or more. For example, in the case of "three", a region surrounded by a triangle becomes the convergence region. Also, in the case of "two", the inside of a constant range in one direction becomes the convergence region.

Also, in the case of a three-dimensional LUT, a range defined by eight lattice points of a square lattice shape is preferably set to the convergence region. Of course, also in this case, the number of lattice points for defining the convergence region is not limited to "eight" and should be at least "two" or more. For example, in the case of arranging three lattice points in a three-dimensional shape as "three", a region surrounded by a triangular pyramid becomes the convergence region.

Figure 12:
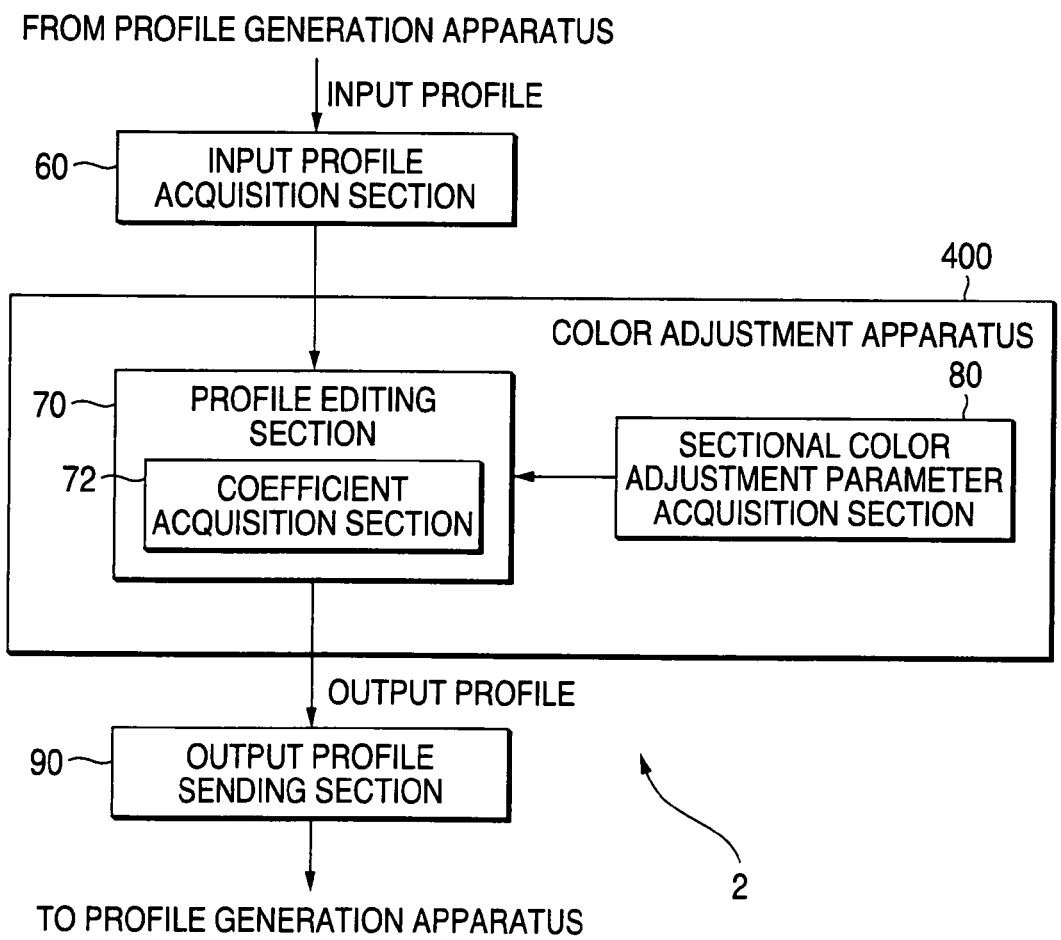
FIG. 12 is a block diagram showing one embodiment of a profile editing apparatus for implementing editing of a color conversion definition by using the partial color adjustment method.

FIG. 12 is a block diagram showing one embodiment of a profile editing apparatus for implementing editing of a color conversion definition by using the partial color adjustment method described above. A profile editing apparatus 2 edits a color conversion definition prepared previously by using the partial color adjustment described above with respect to the color conversion definition for color conversion.

The profile editing apparatus 2 performs editing with respect to a profile including at least DLUT. That is, a color conversion coefficient is obtained using the partial color adjustment. This obtained color conversion coefficient is replaced with a coefficient of the color conversion definition prepared previously. Thereby, an input profile, which is one example of the color conversion definition, is edited. For example, the partial color adjustment described above is performed with respect to a profile previously generated by a profile generation apparatus and a change is made to an output value stored in a lattice point of a part of the profile, namely a part of the DLUT. In the embodiment, description will be made on an example in which an output value of the DLUT is data of L*a*b* color space.

As shown in FIG. 12, the profile editing apparatus 2 includes an input profile acquisition section 60, a profile editing section 70, a partial color adjustment parameter acquisition section 80, and an output profile sending section 90. The input profile acquisition section 60 acquires an input profile generated by a profile generation apparatus. The profile editing section 70 is one example of a color coordinate movement section for moving color coordinates of each of points in the conversion object region P as described above to perform the partial color adjustment. The partial color adjustment parameter acquisition section 80 is one example of a movement parameter setting section for setting movement parameters in the profile editing section 70. The output profile sending section 90 for returning the output profile edited by the profile editing section 70 to the profile generation apparatus. The profile editing section 70 has a coefficient acquisition section 72 in a similar manner to the partial color adjustment section 20.

A color adjustment apparatus 400 according to this embodiment of the invention includes the profile editing section 70 and the partial color adjustment parameter acquisition section 80.

In this configuration, the profile editing apparatus 2 acquires partial color adjustment parameters by the partial color adjustment parameter acquisition section 80 before performing a change to the input profile acquired by the input profile acquisition section 60. The partial color adjustment parameter acquisition section 80 sets the acquired partial color adjustment parameters to the profile editing section 70. The profile editing section 70 edits the input profile acquired by the input profile acquisition section 60 based on this set partial color adjustment parameters. The profile after this editing is sent out to the profile generation apparatus through the output profile sending section 90 as the output profile.

It may as well be considered that the DLUT is equivalent to color chart image data. In the case of being considered thus, the partial color adjustment similar to that described in the image processing apparatus 1 may be made basically. However, since the lattice points reside in the inside of color space only intermittently, an effect can be expected more in a case that L*a*b* values stored in the lattice points are used as center coordinates of the movement source partial color space P1. Of course, the center coordinates of the movement source partial color space P1 maybe values between the lattice points. However, the embodiment is constructed so that the lattice points can be specified.

FIG. 13 is a diagram explaining one configuration example of the partial color adjustment parameter acquisition section 80, and shows a user interface screen. Parameters are acquired by an input of an operator from a user interface such as a keyboard or a mouse.

As shown in the drawing, this partial color adjustment parameter acquisition section 80 generates the user interface screen substantially similar to the partial color adjustment parameter acquisition section 30 in the image processing apparatus 1. As shown in the drawing, the screen has dialog boxes 810, 820, 830, 840 and a color chart display region 850. The dialog box 810 receives specification of shapes of the movement source partial color space P1 and the movement destination partial color space P2. The dialog box 820 inputs center coordinates of the movement source partial color space P1 and center coordinates of the movement destination partial color space P2. The dialog box 830 inputs parameters related to the partial color adjustment dependent on the shapes of the movement source partial color space P1 and the movement destination partial color space P2. The dialog box 840 specifies color charts of L*a*b* color space. The color chart display region 850 displays the color charts. These are similar to the display screen generated by the partial color adjustment parameter acquisition section 30.

Also, the display screen further has a profile display region 860 and a dialog box 870. The profile display region 860 displays the input profile with three planes of a*-b* plane, L*-a* plane and L*-b* plane. The dialog box 870 specifies the color charts with DLUT being as an object. The display screen differs from the display screen generated by the partial color adjustment parameter acquisition section 30 in the two points.

The dialog box 870 in the drawing for selecting the color charts to be displayed displays the DLUT in the inside of a read profile since the DLUT is an object. Therefore, a user selects any of the three planes of a*-b* plane, L*-a* plane and L*-b* plane in the dialog box 870. Also, the color charts displayed in the color chart display region 850 are color charts which the lattice points of the DLUT are formed into. Incidentally, the dialog box 840 and the dialog box 870 cannot be selected simultaneously. Also, the dialog box 840 can be used in the case of using a range between the lattice points as center coordinates, and can be used in specification of the center coordinates of the movement source partial color space P1 and the center coordinates of the movement destination partial color space P2.

Further, since a profile is input to the profile editing apparatus 2, in a screen example shown in the drawing, the profile display region 860 is provided in a portion which is the image display region 360 in the image processing apparatus 1. In this profile display region 860, a range between the lattice points is interpolated by the three planes of a*-b* plane, L*-a* plane and L*-b* plane in which the selected color chart is set to a point of intersection, and a profile is displayed continuously. By this display, in the case of performing a preview, a user can check whether or not it becomes an artificial profile by performing extreme editing.

Also, a user interface screen related to convergence type partial color adjustment (not shown) can be selected. In this case, a dialog box for inputting a ratio of a size of a convergence region to a size of the movement source partial color space P1 is only added to the partial color adjustment described above. The ratio of the size is in a range of "0" to "1". Also in this point, the partial color adjustment parameter acquisition section 80 is similar to the partial color adjustment parameter acquisition section 30 in the image processing apparatus 1.

Also, the convergence type partial color adjustment described above can be applied to a color conversion definition. By specifying a plurality of DLUT lattice points to a convergence region, the DLUT lattice points belonging to the convergence region have substantially a constant color. For example, as shown in the convergence type partial color adjustment in the image processing apparatus 1, an effect of ground removal can also be added to the color conversion definition. Also, the color conversion definition can be set to color conversion using DLUT from RGB color space to L*a*b* color space, and inverse transformation of the color conversion definition can be set to color conversion using the color conversion definition, that is, DLUT from L*a*b* color space to RGB color space.

In this case, after an input RGB is once converted into L*a*b* color space by a color conversion definition, an output RGB is generated by another color conversion definition. It is expected that the input RGB is substantially equal to the output RGB. However, there is often the case that R, G, B monochromatic colors in the input RGB are not necessarily monochromatic colors in the output RGB. This is because L*a*b* lattice points of the color conversion definition for the output RGB are created independently of the color conversion definition for the input RGB. In the case of making an attempt so that the output RGB is also a monochromatic color when the input RGB is a monochromatic color, it is effective that the convergence type partial color adjustment is performed on a proper lattice point of the color conversion definition for the output RGB and an output value of the color conversion definition for the output RGB is made a monochromatic color.

FIG. 14 is a block diagram showing one embodiment of an image processing system for performing color conversion using an output profile edited by the profile editing apparatus 2 described above. As shown in the drawing, an image processing system 9 includes an image processing apparatus 100, the profile editing apparatus 2 and a profile generation apparatus 500. The profile editing apparatus 2 is similar to that described in the embodiment.

In the image processing apparatus 100 described above, color conversion of a particular color in an input image can also be made partially into another color by obtaining a color coordinate value after conversion one by one using an individual color coordinate value of the input image as a color of a conversion object. However, such sequential processing requires time and is not practical. On the contrary, this image processing system 9 is constructed so that an input profile having a coefficient (a color conversion coefficient) for color gamut conversion is previously edited by the profile editing apparatus 2 and color gamut conversion of the input image is made using an output profile after this editing.

As described above, the profile editing apparatus 2 edits a color conversion coefficient on an input profile (specifically, a lookup table) generated by the profile generation apparatus 500 using the partial color adjustment processing described above. The profile editing apparatus 2 returns an output profile configured by this edited color gamut conversion coefficient to the profile generation apparatus 500. The profile generation apparatus 500 writes the output profile received from the profile editing apparatus 2 into a storage medium 28 provided in the image processing apparatus 100.

That is, the color conversion coefficient for color conversion edited using the partial color adjustment processing described above is stored in this storage medium 28. At this time, a relation between an input color coordinate value and an output color coordinate value within the adjustment object color gamut of an input image is stored in the storage medium 28 as lattice point data stored in a multi-dimensional conversion table used for performing color gamut conversion of the input image. The image processing apparatus 1 performs color gamut conversion of the input image by this lattice point data and interpolation calculation.

FIG. 14 shows an example in which an input image signal Sin is RGB data and data after conversion is input to a color display 7, which is one example of a color image output apparatus. The input image signal Sin of the RGB data is input to a color conversion section 10 through an image input section 3. Then, the signal Sin is converted into L*a*b* data by the color conversion section 10 and the L*a*b* data after the conversion is supplied to a partial color adjustment section 20.

As shown in the drawing, the partial color adjustment section 20 and a color conversion section 40 are configured by a three-dimensional table 25, an interpolation calculation section 26 and one-dimensional tables 27r, 27g, 27b. Lattice point data of RGB data edited by the profile editing apparatus 2 is previously stored in the three-dimensional table 25. The storage medium 28 includes the three-dimensional table 25 and the one-dimensional tables 27r, 27g, 27b.

Then, the three-dimensional table 25 is looked up in a high order bit of the L*a*b* data from the color conversion section 10. The lattice point data is read from the three-dimensional table 25. The interpolation calculation of the read lattice point data is performed using a low order bit of the L*a*b* data from the color conversion section 10 in the interpolation calculation section 26. RGB data Ri, Ci, Bi after color gamut conversion is obtained from the three-dimensional table 25.

Public known interpolation processing may be applied as interpolation methods, for example, a method for dividing a unit cube into six triangular pyramids to perform interpolation calculation, a method for dividing a unit cube into two triangular prisms to perform interpolation calculation, or a method for interpolating into a unit cube as it is.

Since a color after the color gamut conversion is obtained by the interpolation calculation of lattice point data thus, points located outside the color gamut of the input image are also included as lattice points in the case of generation or editing of the lattice point data. Because of that, colors outside a display reproduction range are also included in the RGB data Ri, Ci, Bi obtained from the three-dimensional table 25 as colors after color gamut conversion.

Hence, in the RGB data Ri, Ci, Bi from the three-dimensional table 25, by the one-dimensional tables 27r, 27g, 27b, a color signal of the inside of the color gamut of a display which is a reproduction destination device is not corrected where possible and color gamut mapping processing is performed to a color signal of the outside of the color gamut of the display so that inversion of saturation does not occur where possible and RGB data Ro, Co, Bo after this color gamut mapping processing is output to the display 7.

Incidentally, in the embodiment, the case that a function portion of the partial color adjustment section 20 or the profile editing section 70 is configured by hardware has been described, but it is not limited to this, and the processing function described above can also be implemented by software using the so-called electronic calculating apparatus such as a CPU (central processing unit) of a microcomputer or a personal computer.

In this case, the electronic calculating apparatus such as the microcomputer or the personal computer provide each the function portion of the partial color adjustment parameter acquisition section 30 or the profile editing section 70 described above as software. That is, a computer (or CPU, MPU) of the apparatus reads and executes a program code from a storage medium (for example, RAM (not shown)) on which a program code of software for implementing each the function portion of the partial color adjustment parameter acquisition section 30 or the profile editing section 70 described above is recorded, and the effect described in the embodiment is achieved. In this case, the program code itself read from the storage medium implements the functions of the embodiment described above. Incidentally, a program is not limited to a program provided through the storage medium, and may be a program obtained by downloading program data delivered through communication means by wire or wireless.

Also, in addition to the case that each the function is implemented by executing a program code read by a computer, there may be the case that an OS (operating system) operating on the computer performs a part or all of the actual processing based on instructions of its program code and each the function is implemented by its processing. Further, there may be the case that a program code read from a storage medium is written into memory provided in a function expansion card inserted into a computer or a function expansion unit connected to the computer and then a CPU provided in the function expansion card or the function expansion unit performs a part or all of the actual processing based on instructions of its program code and each the function of the embodiment described above is implemented by its processing.

The invention has been described above using the embodiments. However, the technical scope of the invention is not limited to the scope described in the embodiments. Various changes or improvements can be made on the embodiments without departing from the subject matter of the invention. The technical scope of the invention includes forms to which the changes or the improvements are applied are also included.

Also, the embodiment described above does not limit the invention according to claims. All the combinations of features described in the embodiments are not essential as solution means of the invention. The embodiments include the invention at various stages. Various inventions can be extracted by proper combinations of the plurality of constituent components. Even when some constituent components are deleted from all the constituent components shown in the embodiments, as long as the effect of the invention is obtained, a construction in which some constituent components are deleted can be extracted as the invention.

As described above, according to the invention, it is constructed so that a coefficient for converting a color of the inside of an adjustment object region into another color on output color space which is the same color space as input color space is obtained in a state in which continuity of a tone is maintained and inversion of a color is not caused within a range of the adjustment object region. In other words, in the case of moving color coordinates of a particular region to a certain region in the inside of color space of an adjustment object, partial color adjustment can be made without losing continuity of a tone level or a color, that is, without causing image quality defects such as false contouring or gradation inversion in the boundary portion to a region which is not moved.

Therefore, constraint of an inclusive relation which has become a constraint item in a conventional technique can be eliminated by handling the inside of a conversion object region defined by a region for connecting movement source partial color space to movement destination partial color space as an adjustment object color space. Then, by this, for example, the center and a radius of a color to desire to be moved or the center and a radius of a movement destination can be given independently, and flexibility in color adjustment increases. Also, a selective color adjustment function with a high degree of flexibility can be implemented.

FIG. 7
1 IMAGE PROCESSING APPARATUS
3 IMAGE INPUT SECTION
5 IMAGE DATA OUTPUT SECTION
10 COLOR CONVERSION SECTION
20 SECTIONIAL COLOR ADJUSTMENT SECTION
22 COEFFICIENT ACQUISITION SECTION
30 SECTIONIAL COLOR ADJUSTMENT PARAMETER ACQUISITION SECTION
40 COLOR CONVERSION SECTION
400 COLOR ADJUSTMENT APPARATUS

FIG. 8
22 COEFFICIENT ACQUISITION SECTION
210 PRIMARY-REGION INSIDE/OUTSIDE DECISION SECTION
220 MOVEMENT PROCESSING SECTION
230 SECONDARY-REGION INSIDE/OUTSIDE DECISION SECTION
240 SECTIONIAL COLOR ADJUSTMENT CONVERSION SECTION
250 MOVEMENT INVERSE TRANSFORMATION PROCESSING SECTION

FIG. 12
60 INPUT PROFILE ACQUISITION SECTION
70 PROFILE EDITING SECTION
72 COEFFICIENT ACQUISITION SECTION
80 SECTIONIAL COLOR ADJUSTMENT PARAMETER ACQUISITION SECTION
90 OUTPUT PROFILE SENDING SECTION
400 COLOR ADJUSTMENT APPARATUS

FIG. 14
2 PROFILE EDITING APPARATUS
3 IMAGE INPUT SECTION
5 IMAGE DATA OUTPUT SECTION
7 DISPLAY (COLOR IMAGE OUTPUT APPARATUS)
9 IMAGE PROCESSING SYSTEM
10 COLOR CONVERSION SECTION
25 THREE-DIMENSIONAL TABLE
26 INTERPOLATION CALCULATION SECTION
27r,27g,27b ONE-DIMENSIONAL TABLE
500 PROFILE GENERATION APPARATUS

What is claimed is:

1. A color adjustment method for obtaining a coefficient for performing color conversion of input color space into output color space with respect to a predetermined adjustment object region within color space to which a color image belongs, the color adjustment method comprising:
   obtaining a coefficient for converting a color within the adjustment object region into another color on the output color space, which is the same color spaceas the input color space, with maintaining continuity of gradations and not causing color inversion within the adjustment object region,
   wherein the adjustment object region includes:
      movement source partial color space including a color, which is an object of processing of the color conversion, and
      movement destination partial color space including a color corresponding to the obtained coefficient,
   determining a representative color, which represents colors in the movement source partial color space;
   determining a target color, which represents colors in the movement destination partial color space and a target of the color processed by the color conversion;
   obtaining a fundamental vector indicating movement in the color space from the representative color to the target color;
   moving image data included in the adjustment object region in the color space in accordance with a direction and a distance, which the fundamental vector indicates; and
   making an amount of the movement at a boundary of the adjustment object region be substantially zero.

2. The color adjustment method according claim 1, further comprising:
   performing coordinate conversion by revolution displacement so that a straight line connecting the representative color and the target color is parallel to one of color space coordinate axes indicating the adjustment object region;
   performing the color conversion processing with respect to inside of the adjustment object region; and
   performing inverse transformation of the coordinate conversion by the revolution displacement.

3. The color adjustment method according to claim 1, further comprising:
   setting a primary region fully containing the adjustment object region on the input color space;
   determining as to whether pixel data, which an input color signal indicates, is located inside or outside the primary region;
   performing coordinate conversion by revolution displacement with respect to the pixel data, which is determined to be located inside the primary region, so that a straight line connecting the representative color and the target color is parallel to one of color space coordinate axes indicating the adjustment object region;
   determining, with respect to the color signal on which the revolution displacement is performed and the color signal on which the revolution displacement is not performed, as to whether or not the pixel data, which each of color signals indicates, is located inside or outside the adjustment object region;
   performing the color conversion processing with respect to the pixel data, which is determined to be located inside the adjustment object region; and
   performing inverse transformation of the coordinate conversion by the revolution displacement with respect to the pixel data, which is performed the color conversion processing.

4. The color adjustment method according to claim 1, further comprising:
performing coordinate conversion by parallel displacement so that one of the representative color and the target color is moved to the origin of color space coordinate axis indicating the adjustment object region;
performing the color conversion processing with respect to inside of the adjustment object region; and
performing inverse transformation of the coordinate conversion by the parallel displacement.

5. The color adjustment method according to claim 1, further comprising:
setting a primary region substantially fully containing the adjustment object region on the input color space;
determining as to whether pixel data, which an input color signal indicates, is located inside or outside the primary region;
performing coordinate conversion by parallel displacement with respect to the pixel data, which is determined to be located inside the primary region, so that one of the representative color and the target color is moved to the origin of color space coordinate axes indicating the adjustment object region;
determining, with respect to the color signal on which the parallel displacement is performed and the color signal on which the parallel displacement is not performed, as to whether or not the pixel data, which each of the color signals indicates, is located inside or outside the adjustment object region;
performing the color conversion processing with respect to the pixel data, which is determined to be located inside the adjustment object region; and
performing inverse transformation of the coordinate conversion by the parallel displacement with respect to the pixel data, which is performed the color conversion processing.

6. The color adjustment method according to claim 1, further comprising:
setting a convergence region in a part of the adjustment object region; and
obtaining, with respect to a process objection portion, which is in the adjustment object region and other than the convergence region, a coefficient for converting the color within the adjustment object region into another color on the output color space, which is the same color space as the input color space, with maintaining continuity of the gradations and not causing the color inversion within the adjustment object region.

7. A color adjustment method for obtaining a coefficient for performing color conversion of input color space into output color space with respect to a predetermined adjustment object region within color space to which a color image belongs, the color adjustment method comprising:
obtaining a coefficient for converting a color within the adjustment object region into another color on the output color space, which is the same color space as the input color space, with maintaining continuity of gradations and not causing color inversion within the adjustment object region,
wherein movement source partial color space includes a color, which is an object of processing of the color conversion,
wherein movement destination partial color space includes a color corresponding to the obtained coefficient, and wherein the movement source partial color space and the movement destination partial color space inscribe the adjustment object region,
determining a representative color, which represents colors in the movement source partial color space;
determining a target color, which represents colors in the movement destination partial color space and a target of the color processed by the color conversion;
obtaining a fundamental vector indicating movement in the color space from the representative color to the target color;
moving image data included in the adjustment object region in the color space in accordance with a direction and a distance, which the fundamental vector indicates; and
making an amount of the movement at a boundary of the adjustment object region be substantially zero.

8. A color adjustment apparatus for obtaining a coefficient for performing color conversion of input color space into output color space with respect to a predetermined adjustment object region within color space to which a color image belongs, the color adjustment apparatus comprising:
a coefficient acquisition section for obtaining a coefficient for converting a color within the adjustment object region into another color on the output color space, which is the same color space as the input color space, with maintaining continuity of gradations and not causing color inversion within the adjustment object region, wherein:
the coefficient acquisition section determines a representative color, which represents colors in movement source partial color space,
the coefficient acquisition section determines a target color, which represents colors in movement destination partial color space and a target of the color processed by the color conversion,
the coefficient acquisition section obtains a fundamental vector indicating movement in the color space from the representative color to the taraet color,
the coefficient acquisition section moves image data included in the adjustment object region in the color space in accordance with a direction and a distance, which the fundamental vector indicates,
the coefficient acquisition section makes an amount of the movement at boundary of the adjustment object region be substantially zero,
the movement source partial color space includes a color, which is an object of processing of the color conversion, and
the movement destination partial color space includes a color corresponding to the obtained coefficient.

9. The color adjustment apparatus according to claim 8, further comprising:
a movement process section for performing coordinate conversion by revolution displacement so that a straight line connecting the representative color and the target color is parallel to one of color space coordinate axes indicating the adjustment object region;
a color adjustment conversion section for performing the color conversion processing with respect to inside of the adjustment object region; and
an inverse transformation process section for performing inverse transformation of the coordinate conversion by the revolution displacement.

10. The color adjustment apparatus according to claim 8, further comprising:

a primary-region inside/outside determination section for setting a primary region substantially fully containing the adjustment object region on the input color space, and determining as to whether pixel data, which an input color signal indicates, is located inside or outside the primary region;

a movement process section for performing coordinate conversion by revolution displacement with respect to the pixel data, which is determined to be located inside the primary region by the primary-region inside/outside determination section, so that a straight line connecting the representative color and the target color is parallel to one of color space coordinate axes indicating the adjustment object region;

a secondary-region inside/outside determination section for determining, with respect to the color signal on which the revolution displacement is performed by the movement process section and the color signal on which the revolution displacement is not performed, as to whether or not the pixel data, which each of color signals indicates, is located inside or outside the adjustment object region;

a color adjustment conversion section for performing the color conversion processing with respect to the pixel data, which is determined to be located inside the adjustment object region by the secondary-region inside/outside determination section; and an inverse transformation process section for performing inverse transformation of the coordinate conversion by the revolution displacement with respect to the pixel data, which is performed the color conversion processing by the color adjustment conversion section.

11. The color adjustment apparatus according to claim 8, further comprising:

a movement process section for performing coordinate conversion by parallel displacement so that one of the representative color and the target color is moved to the origin of color space coordinate axis indicating the adjustment object region;

a color adjustment conversion section for performing the color conversion processing with respect to inside of the adjustment object region; and an inverse transformation process section for performing inverse transformation of the coordinate conversion by the parallel displacement.

12. The color adjustment apparatus according to claim 8, further comprising:

a primary-region inside/outside determination section for setting a primary region substantially fully containing the adjustment object region on the input color space, and determining as to whether pixel data, which an input color signal indicates, is located inside or outside the primary region;

a movement process section for performing coordinate conversion by parallel displacement with respect to the pixel data, which is determined to be located inside the primary region by the primary-region inside/outside determination section, so that one of the representative color and the target color is moved to the origin of color space coordinate axes indicating the adjustment object region;

a secondary-region inside/outside determination section for determining, with respect to the color signal on which the parallel displacement is performed by the movement process section and the color signal on which the parallel displacement is not performed, as to whether or not the pixel data, which each of color signals indicates, is located inside or outside the adjustment object region;

a color adjustment conversion section for performing the color conversion processing with respect to the pixel data, which is determined to be located inside the adjustment object region by the secondary-region inside/outside determination section; and an inverse transformation process section for performing inverse transformation of the coordinate conversion by the parallel displacement with respect to the pixel data, which is performed the color conversion processing by the color adjustment conversion section.

13. The color adjustment apparatus according to claim 8, wherein at least one of the movement source partial color space and the movement destination partial color space is defined based on a shape thereof and a center coordinate responding to the shape thereof.

14. The color adjustment apparatus according to claim 8, wherein at least one of the movement source partial color space and the movement destination partial color space has a shape, which is one of a sphere shape, a ellipsoidal shape, a cylindrical shape, a elliptic cylinder shape, a rectangular parallelepiped shape, and a closed solid shape at least other than a torus shape.

15. The color adjustment apparatus according to claim 8, wherein the color space of a color signal, which is processed by the coefficient acquisition section when the coefficient is obtained, is device-independent color space.

16. The color adjustment apparatus according to claim 8, wherein the color space of a color signal, which is processed by the coefficient acquisition section when the coefficient is obtained, be device-dependent color space.

17. The color adjustment apparatus according to claim 8, wherein:

the coefficient acquisition section sets a convergence region in a part of the adjustment object region; and the coefficient acquisition section obtains, with respect to a process objection portion, which is in the adjustment object region and other than the convergence region, the coefficient for converting the color within the adjustment object region into the another color on the output color space, which is the same color space as the input color space, with maintaining continuity of the gradations and not causing the color inversion within the adjustment object region.

18. The color adjustment apparatus according to claim 8, further comprising:

a movement parameter setting section for selecting a specified color chart from a plurality of color charts displayed on a predetermined display medium to specify at least one of color coordinates of the representative color and color coordinates of the target color, wherein the coefficient acquisition section executes the process for obtaining the coefficient based on the color coordinates specified by the movement parameter setting section.

19. The color adjustment apparatus according to claim 8, further comprising:

a movement parameter setting section for selecting a receiving specification of pixel point in the color image displayed on a predetermined display medium to specify at least one of color coordinates of the representative color and color coordinates of the target color, wherein the coefficient acquisition section executes the process for obtaining the coefficient based on the color coordinates specified by the movement parameter setting section.

20. The color adjustment apparatus according to claim 8, further comprising:
a movement parameter setting section for specifying at least one of a shape of the movement source partial color space and a shape of the movement destination partial color space,
wherein the coefficient acquisition section executes the process for obtaining the coefficient based on the shape specified by the movement parameter setting section.

21. The color adjustment apparatus according to claim 8, further comprising:
a movement parameter setting section for specifying, in response to at least one of a shape of the movement source partial color space and a shape of the movement destination partial color space, a size of the shape corresponding to specification of radius with respect to a sphere shape,
wherein the coefficient acquisition section executes the process for obtaining the coefficient based on the size of the shape specified by the movement parameter setting section.

22. A color conversion definition editing apparatus for editing a color conversion definition including a coefficient for performing color conversion of input color space into output color space with respect to a predetermined adjustment object region within color space to which a color image belongs, the color conversion definition editing apparatus comprising:
a color adjustment apparatus including a coefficient acquisition section for obtaining a coefficient for converting a color within the adjustment object region into another color on the output color space, which is the same color space as the input color space, with maintaining continuity of gradations and not causing color inversion within the adjustment object region; and
a coefficient editing section for replacing the coefficient obtained by the coefficient acquisition section with a coefficient of the color conversion definition, which is prepared in advance, to edit the color conversion definition, wherein:
the coefficient acquisition section determines a representative color, which represents colors in movement source partial color space;
the coefficient acquisition section determines a target color, which represents colors in movement destination partial color space and a target of the color processed by the color conversion;
the coefficient acquisition section obtains a fundamental vector indicating movement in the color space from the representative color to the target color;
the coefficient acquisition section moves image data included in the adjustment object region in the color space in accordance with a direction and a distance, which the fundamental vector indicates; and
the coefficient acquisition section makes an amount of the movement at boundary of the adjustment object region be substantially zero.

23. The color conversion definition editing apparatus according to claim 22, wherein:
movement source partial color space includes a color, which is an object of processing of the color conversion;
movement destination partial color space includes a color corresponding to the obtained coefficient;
the coefficient included in the color conversion definition is data of a lattice point of at least one dimension look-up table; and
the coefficient editing section makes at least one of the lattice point of the look-up table be color coordinates of representative color of the movement source partial color space.

24. The color conversion definition editing apparatus according to claim 23, wherein:
the coefficient acquisition section sets a convergence region in a part of the adjustment object region;
the coefficient acquisition section obtains, with respect to a process objection portion, which is in the adjustment object region and other than the convergence region, the coefficient for converting the color within the adjustment object region into the another color on the output color space, which is the same color space as the input color space, with maintaining continuity of the gradations and not causing the color inversion within the adjustment object region;
the coefficient included in the color conversion definition is data of a lattice point of at least one dimension look-up table; and
the coefficient editing section sets the convergence region so as to include at least two lattice points of the look-up table.

25. An image processing apparatus for converting, with respect to a predetermined adjustment object region within color space to which a color image belongs, a color into another color on the same color space to convert a specific color included an input color image into the another color, the image processing apparatus comprising:
a storage section for storing a color conversion definition; and
a partial color adjustment section for converting pixel data indicating color of each pixel included in the adjustment object region extracted from the input color image in the color space based on the color conversion definition stored by the storage section, wherein
the color conversion definition is edited by a color conversion definition editing apparatus for editing the color conversion definition including a coefficient for performing color conversion of input color space into output color space with respect to a predetermined adjustment object region within color space to which a color image belongs, the color conversion definition editing apparatus including:
a color adjustment apparatus including a coefficient acquisition section for obtaining a coefficient for converting a color within the adjustment object region into another color on the output color space, which is the same color space as the input color space, with maintaining continuity of gradations and not causing color inversion within the adjustment object region; and
a coefficient editing section for replacing the coefficient obtained by the coefficient acquisition section with a coefficient of the color conversion definition, which is prepared in advance, to edit the color conversion definition;
the coefficient acquisition section determines a representative color, which represents colors in movement source partial color space;

the coefficient acquisition section determines a target color, which represents colors in movement destination partial color space and a target of the color processed by the color conversion;

the coefficient acquisition section obtains a fundamental vector indicating movement in the color space from the representative color to the target color;

the coefficient acquisition section moves image data included in the adjustment object region in the color space in accordance with a direction and a distance, which the fundamental vector indicates; and the coefficient acquisition section makes an amount of the movement at boundary of the adjustment object region be substantially zero.

26. A computer readable storage medium storing a program for obtaining a coefficient for performing color conversion of input color space into output color space with respect to a predetermined adjustment object region within color space to which a color image belongs, the program causing a computer to conduct a procedure comprising:

obtaining a coefficient for converting a color within the adjustment object region into another color on the output color space, which is the same color space as the input color space, with maintaining continuity of gradations and not causing color inversion within the adjustment object region, determining a representative color, which represents colors in the movement source partial color space;

determining a target color, which represents colors in the movement destination partial color space and a target of the color processed by the color conversion;

obtaining a fundamental vector indicating movement in the color space from the representative color to the target color;

moving image data included in the adjustment object region in the color space in accordance with a direction and a distance, which the fundamental vector indicates; and making an amount of the movement at a boundary of the adjustment object region be substantially zero.

27. A computer readable storage medium storing a program for obtaining a coefficient for performing color conversion of input color space into output color space with respect to a predetermined adjustment object region within color space to which a color image belongs, the program causing a computer to conduct a procedure comprising:

obtaining a coefficient for converting a color within the adjustment object region into another color on the output color space, which is the same color space as the input color space, with maintaining continuity of gradations and not causing color inversion within the adjustment object region;

determining a representative color, which represents colors in the movement source partial color space;

determining a target color, which represents colors in the movement destination partial color space and a target of the color processed by the color conversion;

obtaining a fundamental vector indicating movement in the color space from the representative color to the target color;

moving image data included in the adjustment object region in the color space in accordance with a direction and a distance, which the fundamental vector indicates; and making an amount of the movement at boundary of the adjustment object region be substantially zero, wherein movement source partial color space includes a color, which is an object of processing of the color conversion, wherein movement destination partial color space includes a color corresponding to the obtained coefficient, and wherein the movement source partial color space and the movement destination partial color space inscribe the adjustment object region.

* * * * *